(12) United States Patent
Sato

(10) Patent No.: US 6,477,006 B1
(45) Date of Patent: Nov. 5, 2002

(54) THIN-FILM MAGNETIC HEAD FOR TRACK WIDTH NOT MORE THAN 1 μM ON RECORDING MEDIUM AND METHOD FOR MAKING THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/573,833

(22) Filed: May 18, 2000

(30) Foreign Application Priority Data

May 19, 1999 (JP) .......................................... 11-139304

(51) Int. Cl.$^7$ .............................. G11B 5/31; G11B 5/39
(52) U.S. Cl. ......................................... 360/126; 360/317
(58) Field of Search ............................ 360/119, 126, 360/317

(56) References Cited

U.S. PATENT DOCUMENTS

| | | | |
|---|---|---|---|
| 4,970,615 A | * 11/1990 | Gau | 360/122 |
| 5,349,745 A | * 9/1994 | Kawabe et al. | 29/603.18 |
| 5,452,164 A | 9/1995 | Cole et al. | 360/126 |
| 5,649,351 A | 7/1997 | Cole et al. | 29/603.14 |
| 5,652,687 A | 7/1997 | Chen et al. | 360/126 |
| 5,802,700 A | 9/1998 | Chen et al. | 29/603.14 |
| 5,949,625 A | * 9/1999 | Sato et al. | 360/120 |
| 6,104,574 A | * 8/2000 | Takano et al. | 360/126 |
| 6,108,167 A | * 8/2000 | Tateyama et al. | 360/126 |
| 6,188,544 B1 | * 2/2001 | Mino | 360/126 |
| 6,201,670 B1 | * 3/2001 | Chang et al. | 360/126 |
| 6,282,056 B1 | * 8/2001 | Feng et al. | 360/126 |
| 6,301,076 B1 | * 10/2001 | Stageberg et al. | 360/126 |

* cited by examiner

*Primary Examiner*—David L. Ometz
(74) *Attorney, Agent, or Firm*—Brinks Hofer Gilson & Lione

(57) ABSTRACT

The upper face of a lower core layer is planarized by polishing, and a lower magnetic pole layer, a gap layer, and an upper magnetic pole layer are deposited in that order on the lower core layer so that the lower core layer connects to the lower magnetic pole layer. The lower magnetic pole layer, the gap layer, and the upper magnetic pole layer are partly removed using a mask layer, and an insulating layer is deposited on the removed portion to form a main portion and an adjoining portion of a groove. A gap depth Gd is formed in the upper magnetic pole layer, and an back insulating layer is formed on the gap layer in a back region. An upper core layer is formed so as to connect to the upper magnetic pole layer and to partly cover a coil in the magnetic pole end region.

18 Claims, 34 Drawing Sheets

THIN-FILM MAGNETIC HEAD FOR TRACK WIDTH NOT MORE THAN 1 μM ON RECORDING MEDIUM AND METHOD FOR MAKING THE SAME

BACKGROUND OF THE INVENTION

1. Field of the Invention

The present invention relates to thin-film magnetic heads and methods for making the same. In particular, the present invention relates to a thin-film magnetic head for a track width of 1 μm or less and to a method for making the same.

2. Description of the Related Art

FIGS. 51 and 52 are a perspective view and a cross-sectional view, respectively, of a conventional floating thin-film magnetic head 150. The floating thin-film magnetic head 150 has a slider 151 and a combined thin-film magnetic head 157. Numeral 155 represents a leading side which is upstream of the moving direction of the slider 151 on a recording medium and numeral 156 represent a trailing side which is downstream of the moving direction. The slider 151 has an opposing face 152 which opposes the magnetic recording media, and the opposing face 152 has rails 151a and 151b which form air grooves 151c and 151c therebetween. The combined thin-film magnetic head 157 is provided on a trailing end 151d of the slider 151.

FIG. 53 is a perspective view of the combined thin-film magnetic head 157. With reference to FIGS. 52 and 53, the combined thin-film magnetic head 157 has a MR head h1 including a magnetoresistive element and a thin-film magnetic write head h2 deposited on the trailing end 151d of the slider 151.

The MR head h1 includes a lower shielding layer 163 composed of a magnetic alloy formed on the trailing end 151d of the slider 151, a lower gap layer 164 deposited on the lower shielding layer 163, a magnetoresistive element 165 partly exposed at the opposing face 152, an upper gap layer 166 covering the magnetoresistive element 165 and the lower gap layer 164, and an upper shielding layer 167 covering the upper gap layer 166. The upper shielding layer 167 also functions as a lower core layer of the thin-film magnetic write head h2.

The MR head h1 is used as a reading head. When a small fringing magnetic field from a recording magnetic medium is applied to the MR head h1, the resistance of the magnetoresistive element 165 changes. The MR head h1 detects a change in voltage based on the change in the resistance as reading signals from the magnetic recording medium.

The thin-film magnetic write head h2 includes the upper shielding layer or lower core layer 167, a gap layer 174 deposited on the upper shielding layer 167, a coil 176 formed in a back region Y of the gap layer 174, an upper insulating layer 177 covering the coil 176, and an upper core layer 178 which connects to the gap layer 174 in a magnetic pole end region X and to the upper shielding layer 167 in the back region Y.

The coil 176 has a planar spiral pattern. A bottom end 178c of the upper core layer 178 is magnetically coupled to the upper shielding layer 167 substantially in the center of the coil 176. The upper core layer 178 is covered with a protective layer 179 composed of alumina or the like.

The upper shielding layer 167, the gap layer 174, and the upper core layer 178 extend from the back region Y to the magnetic pole end region X and are exposed at the opposing face 152. The opposing face 152 has a magnetic gap of the gap layer 174 interposed between the upper core layer 178 and the upper shielding layer 167.

As shown in FIG. 52, in the magnetic pole end region X, the gap layer 174 is interposed between the upper core layer 178 and the lower core layer 167 in the vicinity of the opposing face 152. The back region Y lies behind the magnetic pole end region X.

The thin-film magnetic head h2 is a write head. When a recording current is applied to the coil 176, the recording current produces a magnetic flux in the upper core layer 178 and the upper shielding layer 167. The magnetic flux leaks as a fringing magnetic field from the magnetic gap toward the exterior. The fringing magnetic field magnetizes a magnetic recording medium to record signals.

In the production of the thin-film magnetic write head h2. however, the upper shielding layer 167 and the gap layer 174 are formed, and then the upper core layer 178 is formed by frame plating or the like so that the width thereof corresponds to the magnetic recording track width at the opposing face 152. The magnetic recording track width on the media can be reduced by decreasing t he magnetic recording track width of the thin-film magnetic write head h2, that is, the width of the upper core layer 178 exposed at the opposing face 152 at the magnetic pole end region. As a result, the track density on the magnetic recording medium and thus the recording density are improved.

When the magnetic recording track width is designed to be 1 μm or less for high-density recording in the above thin-film magnetic head, the thickness of the laminate of the upper core layer 178, the gap layer 174, and the lower core layer 167 is significantly large with respect to the magnetic recording track width . If the thick laminate structure including the narrow upper core layer 178 is simultaneously formed by frame plating, the focal depth of exposure light is not matched during the formation of a resist frame, resulting in decreased resolution. Thus, the width of the upper core layer 178 is not constant at the edge, and a desired track width is not formed.

In order to achieve high-density recording by forming a magnetic recording track width of 1 μm or less, a configuration shown in FIG. 54 is disclosed in U.S. Pat. Nos. 5,452,164 and 5,652,687.

FIG. 55 is an enlarged perspective view of a portion A in the magnetic pole end region X in the production process of a thin-film magnetic head 257 shown in FIG. 54. A groove 43 extending from the opposing face 152 is formed in an insulating layer 244. With reference to FIG. 56, a lower magnetic pole layer 167b as a part of the lower core layer 167, the gap layer 174, and an upper magnetic pole layer 178b as a part of the upper core layer 178 are deposited in that order by an electroplating process in the groove 43 to form the magnetic gap. The magnetic recording track width is controlled by determining the width of the groove 43.

The upper core layer 178 is connected to the upper magnetic pole layer 178b to complete a configuration shown in FIGS. 57 and 58, wherein FIG. 57 is a front view of the thin-film magnetic head 257 shown in FIG. 54 when viewed from the opposing face 152, and FIG. 58 is an enlarged cross-sectional view of the portion A of the thin-film magnetic head 257 in FIG. 54. As shown in FIG. 58, an edge portion of the lower magnetic pole layer 167b and the upper magnetic pole layer 178b at the back region Y defines a gap depth Gd.

As described above, the magnetic recording track width on the media can be reduced and recording densities on the magnetic recording media can be increased by decreasing the recording track width, that is, the width of the lower magnetic pole layer 167b, the gap layer 174, and the upper magnetic pole layer 178b.

In the conventional thin-film magnetic write head h2, the lower magnetic pole layer 167b, the gap layer 174, and the upper magnetic pole layer 178b are deposited by electroplating in the groove 43. Thus, components for these layers are limited to materials which can be deposited by electroplating. On the other hand, use of high-performance magnetic materials for thin-film magnetic heads are required for achieving higher recording densities and miniaturization of magnetic recording media. In particular, a magnetic gap width of 1 μm or less is required for achieving higher recording densities of magnetic recording media.

When the magnetic recording track width is decreased, as shown in FIG. 56, the face at the gap depth Gd is not necessarily formed to be parallel to the opposing face 152. With reference to FIG. 54, the groove 43 is generally formed in the insulating layer 244 by chemical etching. The corners of the groove 43, however, are rounded due to insufficient etching. With a narrow groove of 1 μm or less, the distortion at the corners adversely affects the entire shape of the groove 43, particularly, the face at the gap depth Gd. In such a case, the fringing magnetic field increases, and thus, the recording efficiency of the thin-film magnetic head is decreased. Thus, the face at the gap depth Gd must be precisely formed.

SUMMARY OF THE INVENTION

Accordingly, objects of the present invention are:

(1) to allow the use of a variety of magnetic gap materials;

(2) to improve the recording efficiency of a thin-film magnetic head;

(3) to provide a thin-film magnetic head having a magnetic recording track width of 1 μm or less which is applicable to a track width of 1 μm or less on a magnetic recording medium;

(4) to provide a method for making a thin-film magnetic head having a magnetic recording track width of 1 μm or less;

(5) to provide a thin-film magnetic head having a precise gap depth applicable to a track width of 1 μm or less; and (6) to provide a method for making a thin-film magnetic head having a precise gap depth applicable to a track width of 1 μm or less.

According to a first aspect of the present invention, a thin-film magnetic head comprises an upper core layer and a lower core layer extending from a back region to a magnetic pole end region, the upper core layer and the lower core layer being exposed at an opposing face opposing a medium and being connected to each other in the back region, a coil provided on the periphery of the connection of the upper core layer and the lower core layer, a gap layer provided between the upper core layer and the lower core layer in the magnetic pole end region, an insulating layer formed on the lower core layer, and a groove formed in the magnetic pole end region of the insulating layer and extending from the opposing face to the back region. The groove forms an opening in the lower core layer, the upper core. layer, and the opposing face, and has a main portion having a cross-sectional size which is substantially the same as the size of the opening at the opposing face. The lower magnetic layer, the gap layer, and the upper magnetic layer are deposited in the groove. The lower magnetic pole layer is in contact with the lower core layer and the upper magnetic pole layer is in contact with the upper core layer so that the upper magnetic pole layer constitutes an upper magnetic pole end and the lower magnetic pole layer constitutes a lower magnetic pole end. Moreover, in the exposed section at the opposing face, the length of the lower magnetic pole layer in the track width direction is larger than the length of the upper magnetic pole layer in the track width direction.

In such a configuration, the magnetic gap width can be reduced to a submicron order of 1 μm or less by reducing the width of the groove.

Preferably, the groove has an adjoining portion extending from the main portion to a part of the back region.

Preferably, a back insulating layer is deposited in the back region of the gap layer.

Preferably, at the opposing face, the difference between the length of the lower magnetic pole layer in the track width direction and the length in the track width direction of the upper magnetic pole layer in contact with the gap layer is equal to or less than the thickness of the gap layer.

Preferably, the adjoining portion extending to the back region has a cross-sectional size which is substantially the same as that of the main portion. Alternatively, the cross-sectional size of the adjoining portion extending to the back region may gradually increase in the track width direction of the lower core layer.

Preferably, the back insulating layer has a sloping face so that the thickness of the back insulating layer increases toward the back region.

The lower magnetic pole layer and the gap layer may be deposited in the magnetic pole end region and the back region of the groove, and the upper magnetic pole layer may be deposited in the magnetic pole end region of the groove. The back end of the upper magnetic pole layer may define the gap depth.

This configuration can exactly determine the distance between the opposing face and the back end of the upper magnetic pole layer. Thus, the gap depth is exactly defined.

Preferably, the length of the upper magnetic pole layer from the opposing face, that is, the gap depth, is equal to or larger than the width of the upper magnetic pole layer.

A coil insulating layer may be deposited on the back insulating layer and may have a sloping face toward the sloping face of the back insulating layer. The coil insulating layer can expand the distance between the lower core layer and the upper core layer in the back region of the groove. Thus, the fringing magnetic flux from the upper core layer to the lower core layer is reduced. Accordingly, overwrite characteristics and recording efficiency of the magnetic head are improved.

Preferably, the gap layer comprises metal.

Preferably, each of the upper magnetic pole layer and the lower magnetic pole layer comprises one alloy selected from the group consisting of a Ni—Fe alloy; a Ni—Fe—Nb alloy; a Co—Fe alloy; a Co—Fe—Ni alloy; a Co—Fe—Ni—X alloy wherein X is at least one element selected from the group consisting of Mo, Cr, Pd, B, and In; a Co—Zr—Nb alloy; a Co—Hf—Nb alloy; an Fe—M—C alloy wherein M is at least one element selected from the group consisting of Hf, Zr, Ti, V, Nb, Ta, Cr, Mo, and W; a T—X—M—Z—Q alloy wherein T is at least one element of Fe and Co, X is at least one element of Si and Al, M is at least one element selected from the group consisting of Ti, Zr, Hf, V, Ta, Mo, and W, Z is at least one element of C and N, and Q is at least one element selected from the group consisting of Cr, Re, Rh, Ni, Pd, Pt, and Au; a T—Si—Al—M—Z—Q alloy wherein T is at least one element of Fe and Co, M is at least one element of Zr, Hf, Nb, and Ta, Z is at least one element of C and N, and Q is at least one element selected from the group consisting of Cr, Ti, Mo, W, V, Re, Ru, Ni, Pd, Pt, and Au: and an Fe—M—O alloy wherein M is at least one element selected from the group consisting of Hf, Zr, Ti, V, Nb, Ta, Cr, Mo, and W.

The Ni—Fe alloy represented by the formula $Ni_xFe_y$ preferably satisfies the following relationships in which x and y are atomic percent:

$$86 \leq x \leq 92, 8 \leq y \leq 14, \text{ and } x+y=100.$$

This soft magnetic alloy exhibits superior soft magnetism and is suitable for the core of the thin-film magnetic head.

The Ni—Fe—Nb alloy represented by the formula $Ni_xFe_yNb_z$ preferably satisfies the following relationships in which x, y and z are atomic percent:

$$76 \leq x \leq 84, 8 \leq y \leq 15, 5 \leq z \leq 12, \text{ and } x+y+z=100.$$

This soft magnetic alloy also exhibits superior soft magnetism and is suitable for the core of the thin-film magnetic head. Moreover, the Ni—Fe—Nb alloy exhibits a higher resistivity than that of the Ni—Fe alloy, reduces eddy current loss, and improves high-frequency recording characteristics.

The Co—Fe alloy represented by the formula $Co_xFe_y$ preferably satisfies the following relationships in which x and y are atomic percent:

$$86 \leq x \leq 92, 8 \leq y \leq 14, \text{ and } x+y=100.$$

This soft magnetic alloy exhibits superior soft magnetism and is suitable for the core of the thin-film magnetic head. Moreover, the Co—Fe alloy exhibits higher saturation magnetic flux density and higher resistivity than those of the Ni—Fe—Nb alloy. Thus, this alloy reduces eddy current loss, increases the recording density, and improves high-frequency recording characteristics.

The Co—Fe—Ni alloy represented by the formula $Co_xFe_yNi_z$ preferably satisfies the following relationships in which x, y and z are weight percent:

$$0.1 \leq x \leq 15, 38 \leq y \leq 60, 40 \leq z \leq 62, \text{ and } x+y+z=100.$$

This soft magnetic alloy also exhibits superior soft magnetism and is suitable for the core of the thin-film magnetic head. Moreover, the Co—Fe—Ni alloy exhibits a higher saturation magnetic flux density and higher resistivity than those of the Ni—Fe—Nb alloy and the Co—Fe alloy, reduces eddy current loss, increases the recording density, and improves high-frequency recording characteristics.

The Co—Fe—Ni—X alloy, in which X is at least one element selected from the group consisting of Mo, Cr, Pd, B, and In, represented by the formula $Co_xFe_yNi_zX_w$, preferably satisfies the following relationships in which x, y, z and w are weight percent:

$$0.1 \leq x \leq 15, 38 \leq y \leq 60, 40 \leq z \leq 62, 0.1 \leq w \leq 3, \text{ and } x+y+z+w=100.$$

This soft magnetic alloy also exhibits superior soft magnetism and is suitable for the core of the thin-film magnetic head. Moreover, this Co—Fe—Ni—X alloy exhibits higher resistivity than that of the Co—Ni alloy, and significantly reduces eddy current loss which is advantageous for high-frequency recording. In addition, the Co—Fe—Ni—X alloy exhibits a saturation magnetic flux density which is comparable to that of the Co—Fe—Ni alloy and is suitable for high-density recording.

The Co—Zr—Nb alloy represented by the formula $Co_xZr_yNb_z$ preferably satisfies the following relationships in which x, y, and z are atomic percent:

$$1.5 \leq y \leq 13, 6.5 \leq z \leq 15, 1 \leq (y/z) \leq 2.5, \text{ and } x+y+z=100.$$

This soft magnetic alloy exhibits significantly superior soft magnetism and is suitable for the core of the thin-film magnetic head, since this alloy does not exhibit crystalline magnetic anisotropy when the core is deposited.

The Co—Hf—Nb alloy represented by the formula $Co_xHf_yNb_z$ preferably satisfies the following relationships in which x, y, and z are atomic percent:

$$1.5 \leq y \leq 13, 6.5 \leq z \leq 15, 1 \leq (y/z) \leq 2.5, \text{ and } x+y+z=100.$$

This soft magnetic alloy also exhibits significantly superior soft magnetism and is suitable for the core of the thin-film magnetic head, since this alloy does not exhibit crystalline magnetic anisotropy when the core is deposited.

The Fe—M—C alloy is composed of a crystalline phase essentially consisting of Fe and a crystalline phase of carbide of at least one element selected from the group consisting of Hf, Zr, Ti, V, Nb, Ta, Cr, Mo, and W. On the whole, the alloy-is preferably composed of fine crystallites having an average crystal grain size of 40 nm or less. Preferably, the average crystal grain size d of the carbide and the average crystal grain size D of the Fe crystal satisfy the relationship $0.05 \leq d/D \leq 0.4$.

More preferably, the Fe—M—C alloy represented by the formula $Fe_xM_yC_z$ preferably satisfies the following relationships in which x, y, and z are atomic percent:

$$50 \leq x \leq 96, 2 \leq y \leq 30, 0.5 \leq z \leq 25 \text{ and } x+y+z=100.$$

This soft magnetic alloy also exhibits significantly superior soft magnetism and is suitable for the core of the thin-film magnetic head, since crystalline magnetic anisotropy is extremely low due to fine crystal grains which are formed by precipitation of M carbide. Since this alloy exhibits a higher saturation magnetic flux density and a lower coercive force than those of the above alloys, the soft magnetism is more satisfactory and is suitable for high-density recording. Moreover, the precipitated M carbide contributes to improved heat resistance.

The T—X—M—Z—Q alloy is composed of a crystalline phase essentially consisting of Fe or Co and a crystalline phase of a carbide or a nitride of at least one element selected from the group consisting of Ti, Zr, Hf, V, Ta, Mo, and W. On the whole, the alloy is preferably composed of fine crystallites having an average crystal grain size of 40 nm or less. Preferably, the average crystal grain size d of the carbide or nitride and the average crystal grain size D of the Fe or Co crystal satisfy the relationship $0.05 \leq d/D \leq 0.4$.

More preferably, the T—X—M—Z—Q alloy represented by the formula $T_aX_bM_cZ_dQ_e$, in which T is at least one element of Fe and Co, X is at least one element of Si and Al, and M is at least one element selected from the group consisting of Ti, Zr, Hf, V, Ta, Mo, and W, preferably satisfies the following relationships in which a, b, c, d, and e are atomic percent:

$$0 \leq a \leq 25, 0 \leq b \leq 25, 1 \leq c \leq 10, 5 \leq d \leq 15, 0 \leq e \leq 10, \text{ and } a+b+c+d+e=100.$$

This soft magnetic alloy also exhibits significantly superior soft magnetism and is suitable for the core of the thin-film magnetic head. Moreover, the X component increases the resistivity of the alloy to a level of 120 $\mu\Omega$cm or more, which is higher than that of the Fe—M—C alloy. Thus, this alloy exhibits small eddy current loss and is suitable for high-frequency recording. The X component contributes to improved corrosion and oxidation resistance compared to the Fe—M—C alloy.

The T—Si—Al—M—Z—Q alloy is composed of a body centered cubic fine crystalline phase essentially consisting of Fe or Co and having an average crystal grain size of 40 nm or less and a crystalline phase of a carbide or a nitride of at least one element selected from the group consisting of Ti, Zr, Hf, Nb, and Ta which is precipitated at the grain boundaries of the fine crystalline phase, wherein at least one element of Si and Al and at least one element selected from the group consisting of Cr, Ti, Mo, W, V, Re, Ru, RH, Ni, Pd, Pt, and Au are dissolved in the body centered cubic crystalline phase.

More preferably, the T—Si—Al—M—Z—Q alloy represented by the formula $T_a Si_b Al_c M_d Z_e Q_f$, in which T is at least one element of Fe and Co, M is at least one element of Zr, Hf, Nb, and Ta, Z is at least one element of C and N, and Q is at least one element selected from the group consisting of Cr, Ti, Mo, W, V, Re, Ru, Ni, Pd, Pt, and Au, preferably satisfies the following relationships in which a, b, c, d, e, and f are atomic percent:

$8 \leq b \leq 15$, $0 \leq c \leq 10$, $1 \leq d \leq 10$, $1 \leq e \leq 10$, $0 \leq f \leq 15$, and $a+b+c+d+e+f=100$.

This soft magnetic alloy also exhibits superior soft magnetism and is suitable for the core of the thin-film magnetic head. Moreover, this alloy containing both Si, and Al has an absolute value of magnetostriction which is smaller than that of the T—X—M—Z—Q alloy. Thus, this alloy exhibits decreased internal stress and is resistant to changes in temperature.

The Fe—M—O alloy represented by the formula $Fe_a M_b O_c$, in which M is at least one element selected from the group consisting of Hf, Zr, Ti, V, Nb, Ta, Cr, Mo, and W, preferably satisfies the following relationships in which a, b, and c are atomic percent:

$50 \leq a \leq 70$, $5 \leq b \leq 30$, $10 \leq c \leq 30$, and $a+b+c=100$.

This soft magnetic alloy also exhibits significantly superior soft magnetism, that is, low coercive force, and is suitable for the core of the thin-film magnetic head, since this alloy does not exhibit crystalline magnetic anisotropy. Moreover, this alloy exhibits a higher resistivity of 400 to $2 \times 10^5$ $\mu \Omega$cm, contributes to a significant decrease in eddy current loss, and improves recording characteristics in high-frequency regions of several tens of MHz.

The upper face of the lower core layer may be planarized by polishing. The tilt angle of the tapered sections of the said walls is preferably in a range of 10 degrees to 80 degrees with respect to the upper face of the lower core layer. The tilt angle of the sloping face of the back insulating layer is preferably in a range of 10 degrees to 80 degrees with respect to the lower core layer. The back insulating layer may extend from the insulating layer.

Since a tapered portion is formed on the upper core layer at the upper magnetic pole layer side, a magnetic flux between the upper core layer and the lower core layer becomes smooth and the fringing magnetic flux at the junction between the upper core layer and the lower core layer can be reduced.

The upper face of the lower core layer has a surface roughness Ra of 0.001 to 0.015 $\mu$m by planarization. Thus, the groove can be precisely formed and the magnetic recording track width can be reduced.

The insulating layer preferably comprises at least one material selected from the group consisting of AlO, $Al_2O_3$, SiO; $SiO_2$, $Ta_2O_5$, TiO, AlN, AlSiN, TiN, SiN, $Si_3N_4$, NiO, WO, $WO_3$, BN, and CrN. The insulating layer may have a single-layer configuration or a multi-layer configuration of these materials. When the insulating layer is not etched, the insulating layer may be $B_4C$, sialon, or SiC.

The gap layer preferably comprises at least one material selected from the group consisting of Au, Pt, Rh, Pd, Ru, Cr, NiMo alloys, NiW alloys, NiP alloys, and NiPd alloys. The gap layer may have a single-layer configuration or a multi-layer configuration of these materials. Since these materials are nonmagnetic materials and are not magnetized, these can be preferably used in the gap layer of the thin-film magnetic head. When electroplating is not employed, the gap layer preferably comprises at least one material selected from the group consisting of AlO, $Al_2O_3$, SiO, $SiO_2$, $Ta_2O_5$, TiO, AlN, AlSiN, TiN, SIN, $Si_3N_4$, NiO, WO, $WO_3$, BN, CrN, $B_4C$, sialon, and SiC. The gap layer may have a single-layer configuration or a multi-layer configuration of these materials.

Preferably, the width of the main portion of the groove is 1 $\mu$m or less.

According to a second aspect of the present invention, a combined thin-film magnetic head comprises a magnetic read head having a magnetoresistive element, and the thin-film magnetic head according to the first aspect.

Preferably, the insulating layer, the lower magnetic pole layer, the gap layer, and the upper magnetic pole layer are exposed at the opposing face. Since the magnetic recording track width agrees with the width of the groove in the insulating layer at the opposing face, the magnetic recording track width can be reduced. Since the magnetic gap is exposed at the opposing face, magnetic recording on a magnetic recording medium can be effectively performed by a fringing magnetic field from the magnetic gap.

According to a third aspect of the present invention, a method for making a thin-film magnetic head, which comprises an upper core layer and a lower core layer extending from a back region to a magnetic pole end region, the upper core layer and the lower core layer being exposed at an opposing face opposing a medium and being connected to each other in the back region, a coil provided on the periphery of the connection of the upper core layer and the lower core layer, and a gap layer provided between the upper core layer and the lower core layer in the magnetic pole end region, comprises the steps of planarizing the upper face of the lower core layer by polishing, depositing the lower magnetic pole layer, the gap layer, and the upper magnetic pole layer on the lower core layer so that the lower core layer connects to the lower magnetic pole layer, removing parts of the lower magnetic pole layer, the gap layer, and the upper magnetic pole layer, and depositing an insulating layer on the lower core layer exposed by the removing step, forming a gap depth, which is substantially parallel to the opposing surface, in the upper magnetic pole layer, forming a coil in the back region, and forming an upper core layer connecting the upper magnetic pole layer in the magnetic pole end region and covering a part of the coil in the back region.

By planarization of the lower core layer, the insulating layer deposited on the subsequent step is also planarized and can be precisely formed by anisotropic etching. As a result, the magnetic gap width can be reduced.

When the lower magnetic pole layer, the gap layer, and the upper magnetic pole layer are formed by anisotropic etching, the width to the thickness of these layers can be precisely determined without side etching.

Preferably, a mask layer extending from the exterior of the opposing face to the magnetic pole end region is formed on the upper magnetic pole layer, and parts of the lower magnetic pole layer, the gap layer, and the upper magnetic pole layer are removed by anisotropic etching.

The mask layer may have a mask main portion having the same size as the size of the magnetic gap at the opposing face and extending in the magnetic pole end region.

The mask layer may be formed on the upper magnetic pole layer from the magnetic pole end region to a part of the back region, and a back insulating layer may be formed on the gap layer in the back region.

The mask layer may comprise the mask main portion and an adjoining mask portion extending from the mask main portion to the back region.

Preferably, an upper mask layer is formed on the upper magnetic pole layer, and then the upper magnetic pole layer is subjected to ion milling to form the gap depth.

Preferably, the back insulating layer has a sloping face which lies in the back region on the gap layer and slopes so as to increase the thickness thereof from the opposing face to the back region, and the sloping face is formed by sputtering or ion beam sputtering while maintaining the upper mask layer on the upper magnetic pole layer and then by removing the upper mask layer.

Preferably, the width of the mask layer at the opposing face is 1 $\mu$m or less.

Preferably, the insulating layer is formed by sputtering or ion beam sputtering while maintaining the mask layer on the upper magnetic pole layer and then by removing the mask layer.

Preferably, at the opposing face, the difference between the length in the track width direction of the lower magnetic pole layer in contact with the gap layer and the length in the track width direction of the upper magnetic pole layer in contact with the gap layer is equal to or smaller than the thickness of the gap layer.

Preferably the gap layer comprises an inorganic insulating material.

The gap layer preferably comprises at least one material selected from the group consisting of AlO, $Al_2O_3$, SiO, $SiO_2$, $Ta_2O_5$, TiO, AlN, AlSiN, TiN, SiN, $Si_3N_4$, NiO, WO, $WO_3$, BN, CrN, $B_4C$, sialon, and SiC. The gap layer may have a single-layer configuration or a multi-layer configuration of these materials. The gap layer can be formed by a sputtering or ion beam sputtering process which is superior to an electroplating process in reproducibility and uniformity of the resulting film.

Moreover, an RF sputtering process and an ion beam sputtering process can deposit a metal material and an insulating material. Since the thickness of the insulating material on the substrate can be measured by a non-contacting thickness meter, the quality control of the product can be readily performed.

Preferably, the thickness of the lower magnetic pole layer is at least 0.1 $\mu$m, and is at least 0.5 times the thickness of the gap layer.

A coil insulating layer having a sloping face toward the sloping face of the back insulating layer may be formed on the back insulating layer.

DESCRIPTION OF THE PREFERRED EMBODIMENTS

First Embodiment

A first embodiment of a thin-film magnetic head and a method for making the same in accordance with the present invention will now be described with reference to the drawings.

Figure 1:
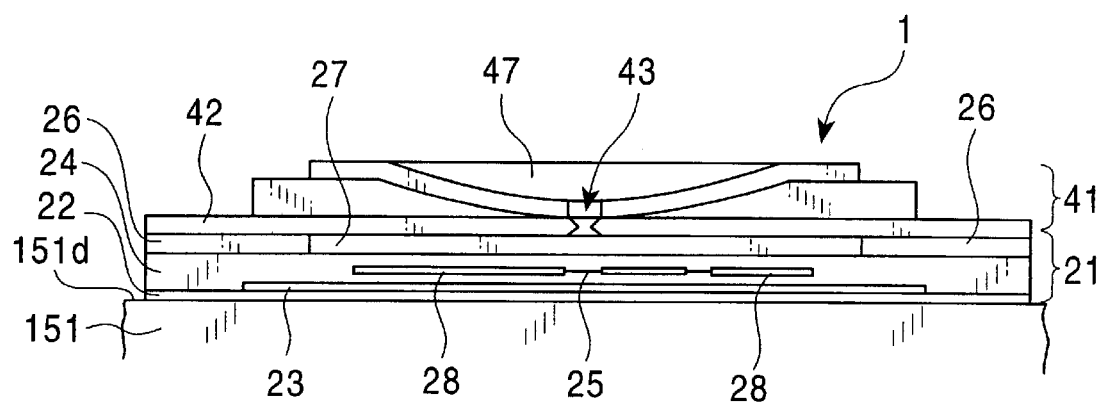
FIG. 1 is a front view of a combined thin-film magnetic head in accordance with a first embodiment of the present invention.
Figure 2:
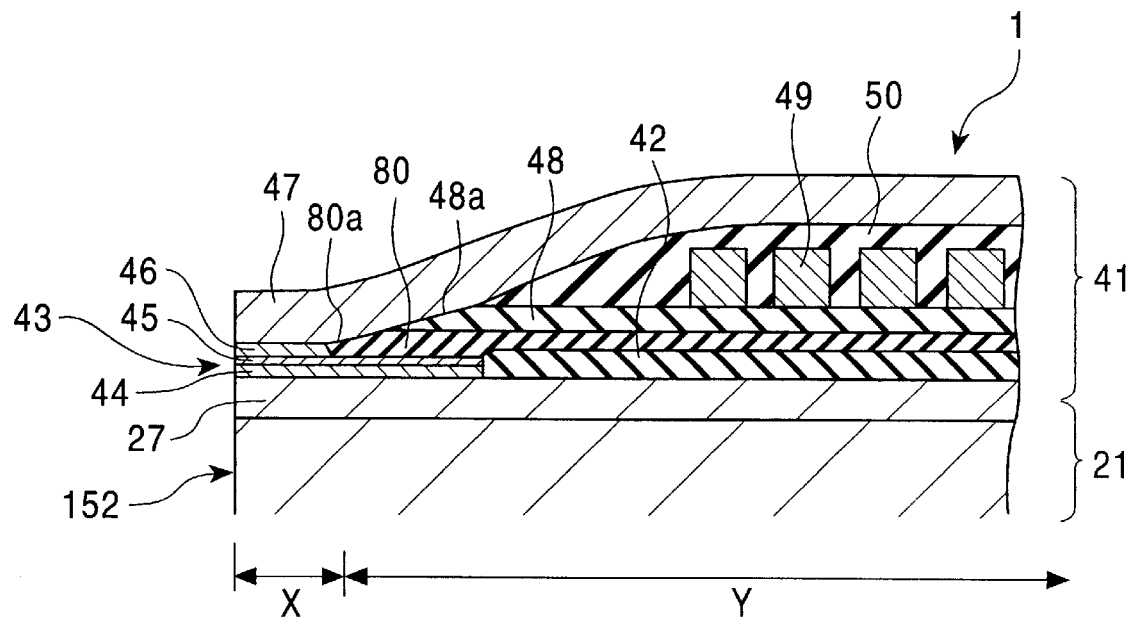
FIG. 2 is a side cross-sectional view of the combined thin-film magnetic head in accordance with the first embodiment of the present invention.

FIGS. 1 and 2 are a front view and a side cross-sectional view, respectively, of a combined thin-film magnetic head 1 of the first embodiment. With reference to FIG. 1, the combined thin-film magnetic head 1 includes a magnetic read head 21 of a MR read head having a magnetoresistive (MR) or a GMR read head and an inductive write head 41 which are deposited on a trailing end 151d of a slider 151.

The magnetic read head 21 includes an insulating layer 22 formed on the trailing end 151d of the slider 151, a lower shielding layer 23 composed of a magnetic alloy and deposited on the insulating layer 22, a read gap layer 24 deposited on the lower shielding layer 23, a magnetoresistive element 25 which is embedded into the read gap layer 24 and which is partially exposed at an opposing face 152 (refer to FIG. 2) opposing a recording medium, a planarization insulating layer 26 deposited on the read gap layer 24, and an upper shielding layer 27 embedded in the planarization insulating layer 26. The upper shielding layer 27 also functions as a lower core layer of the inductive write head 41. The upper shielding layer or lower core layer 27 is preferably composed of a soft magnetic alloy such as a FeNi alloy or a FeCoNi alloy. The lower shielding layer 23, the read gap layer 24, the planarization insulating layer 26, the upper shielding layer 27, and the magnetoresistive element 25 are exposed at the opposing face 152. The magnetoresistive element 25 is provided with electrode layers 28 for supplying a sensing current. The magnetoresistive element 25 may be composed of a soft magnetic material exhibiting a magnetoresistive effect or a giant magnetoresistive element (GMR element).

In the magnetic read head 21, the resistance of the magnetoresistive element 25 changes in response to a fringing magnetic field applied from a recording magnetic medium and causes a change in current. Such a change in the current corresponds to reading signals from the magnetic recording medium.

FIGS. 3, 4A, 4B, and 5 are a perspective view, a front view, magnified front view, and a side cross-sectional view of the main portion, including a groove 43 and a magnetic pole end region X, of the thin-film magnetic head 1 of this embodiment.

In the inductive write head 41, an insulating layer 42 is deposited on the lower core layer (upper shielding layer) 27, and the groove 43 is provided in the insulating layer 42 so as to extend from the opposing face 152 to a back region Y along the magnetic pole end region X. A lower magnetic pole layer 44, a gap layer 45, an upper magnetic pole layer 46, a back insulating layer 80, and a coil insulating layer 48 are deposited in the groove 43. The lower magnetic pole layer 44 connects to the lower core layer 27, while the upper magnetic pole layer 46 connects to an upper core layer 47. The upper magnetic pole layer 46 functions as an upper magnetic pole end, and the lower magnetic pole layer 44 functions as a lower magnetic pole end.

As shown in FIG. 2, the upper core layer 47 and the lower core layer 27 extends over the back region Y and the magnetic pole end region X, and are exposed at the opposing face 152. The upper core layer 47 and the lower core layer 27 are magnetically coupled in the back region Y. The back insulating layer 80 is located on the gap layer 45 and the insulating layer 42 in the back region Y. As shown in FIG. 2, the magnetic pole end region X includes the upper magnetic pole layer 46 and the lower magnetic pole layer 44, which are separated by the gap layer 45, and the back region Y is located behind the magnetic pole end region X.

Figure 3:
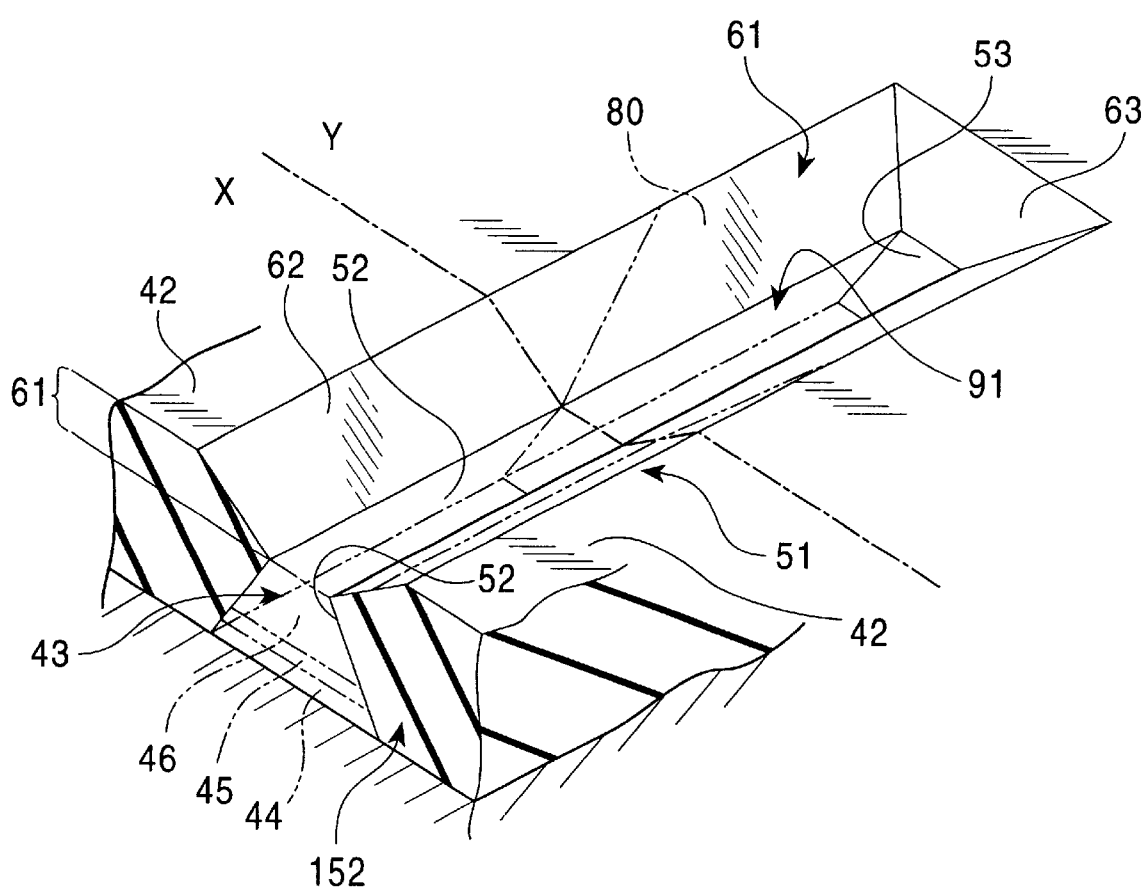
FIG. 3 is a perspective view of the main portion, including a groove and a magnetic pole end region, of the thin-film magnetic head of the first embodiment.
Figure 4A:
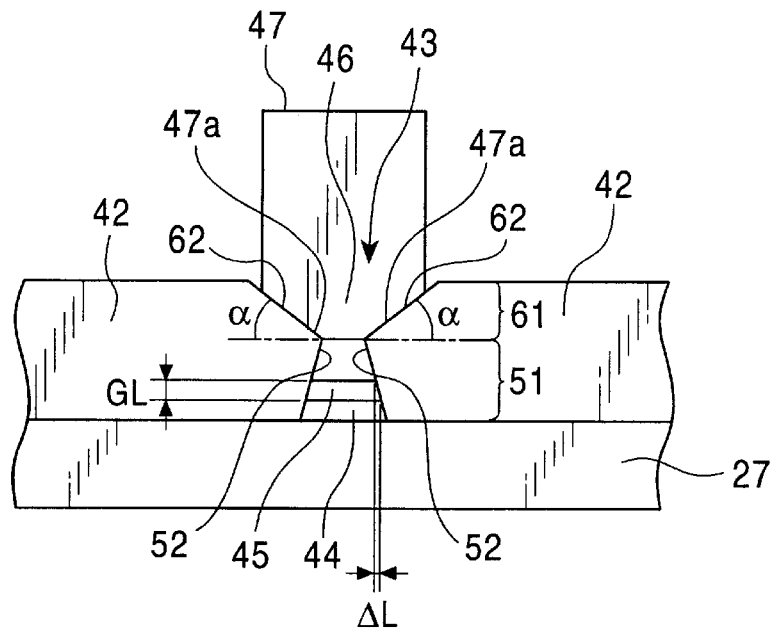
FIGS. 4A and 4B are a front view and an enlarged partial front view, respectively, of the main portion of the magnetic pole end region of the thin-film magnetic head of the first embodiment.
Figure 4B:
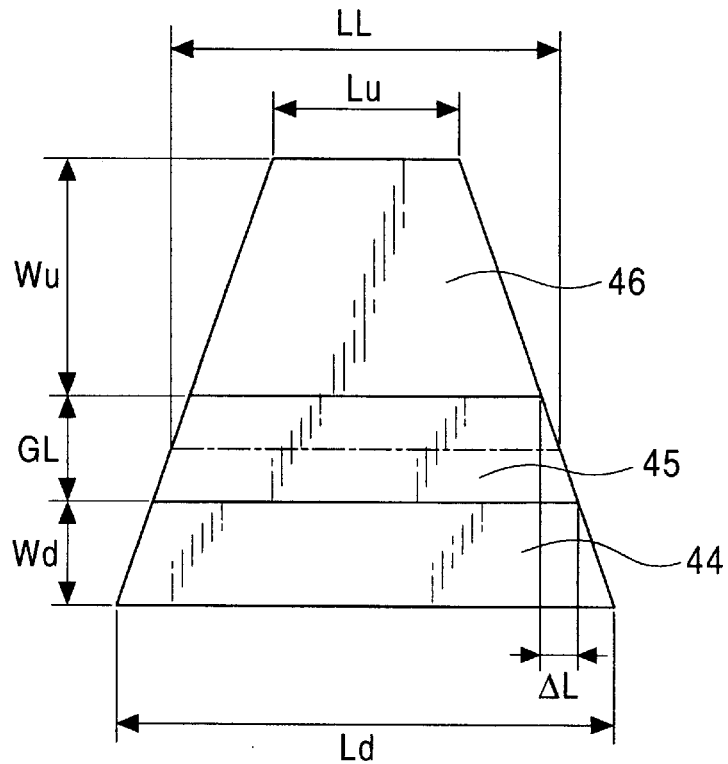
Figure 5:
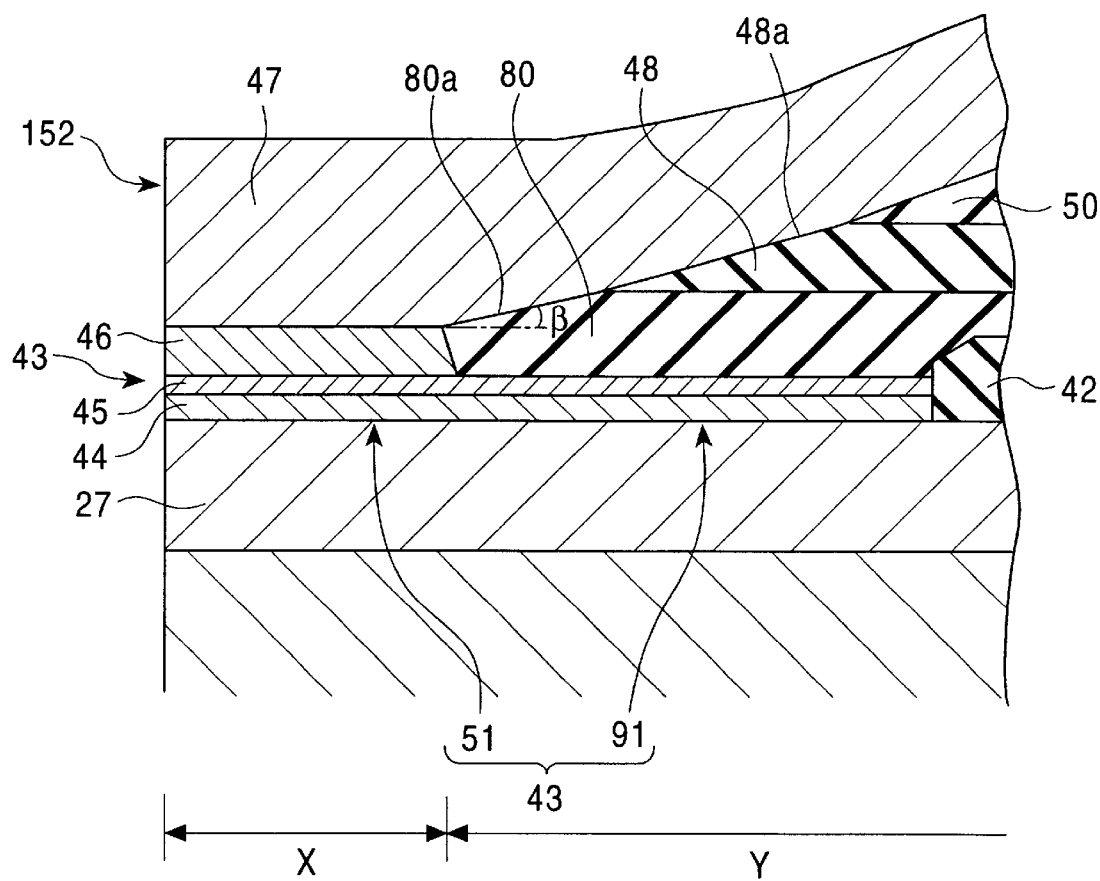
FIG. 5 is a side-cross-sectional view of the main portion of the magnetic pole end region of the thin-film magnetic head of the first embodiment.

As shown in FIGS. 3 to 5, the groove 43 consists of a main portion 51 and an adjoining portion 91. The main portion 51 has a converging cross-sectional area, which is substantially the same as the size of the opening at the opposing face 152, and lies in the magnetic pole end region X on the lower core layer 27. The adjoining portion 91 lies behind the main portion 51, that is, in the back region Y on the lower core layer 27, and has the same cross-section as that of the main portion 51. A diverging section 61 is provided over the main portion 51 and the adjoining portion 91.

The main portion 51 and the adjoining portion 91 have two inwardly sloping side-walls 52 extending from the opposing face 152 to the end of the adjoining portion 91. An end face 53 having the trapezoidal cross-section is thereby formed at the end of the adjoining portion 91. The end face 53 is substantially parallel to the opposing face 152.

The diverging section 61 has two outwardly sloping side-walls 62 over the main portion 51 and the adjoining portion 91 and an outwardly sloping end-wall 63 at the back region Y. The upper core layer 47 is deposited in the diverging section 61 and thus has two tapered sections 47a corresponding to the diverging section 61.

The lower magnetic pole layer 44 and the gap layer 45 extend over the main portion 51 and the adjoining portion 91 and the lower magnetic pole layer 44 is in contact with the lower core layer 27. The upper magnetic pole layer 46 lies in the main portion 51 and is in contact with the upper core layer 47. The back end of the upper magnetic pole layer 46 defines a gap depth in the back region Y.

With reference to FIG. 5, the back insulating layer 80 and the coil insulating layer 48 are deposited on the gap layer 45 in the adjoining portion 91 in the back region Y. The back insulating layer 80 has a sloping face 80a so as to increase the thickness thereof toward the back region Y. The coil insulating layer 48 has a sloping face 48a continuing from the sloping face 80a. The insulating layer 42, the lower magnetic pole layer 44, the gap layer 45, and the upper magnetic pole layer 46 are exposed at the opposing face 152.

With reference to FIGS. 4A and 4B, the lower magnetic pole layer 44, the gap layer 45, and the upper magnetic pole layer 46 together have a trapezoidal cross-section at the opposing face 152 according to the cross-section of the main portion 51 of the groove 43. In the trapezoidal cross-section, the difference 2ΔL in width between the upper face of the lower magnetic pole layer 44 and the lower face of the upper magnetic pole layer 46 is set to be equal to or less than the thickness GL of the gap layer 45.

The gap depth, that is, the depth of the upper magnetic pole layer 46 from the opposing face 152 to the front end of the back region Y is set to be equal to or more than the width of the upper magnetic pole layer 46.

In such a configuration, the magnetic recording track width at the opposing face 152 is substantially equal to the width of the upper magnetic pole layer 46. Thus, the magnetic recording track width can be decreased by reducing the width of the upper magnetic pole layer 46. Moreover, the magnetic gap is exposed at the opposing face 152. Thus, the fringing magnetic field from the magnetic gap facilitates effective magnetic recording on the magnetic recording media.

In the inductive write head 41, the lower core layer 27 and the lower magnetic pole layer 44 form the lower core, and the upper core layer 47 and the upper magnetic pole layer 46 form the upper core. In addition, the lower magnetic pole layer 44, the gap layer 45, and the upper magnetic pole layer 46 form the magnetic gap. As a result, the magnetic gap is interposed between the upper core and the lower core.

Since the lower magnetic pole layer 44, the gap layer 45, and the upper magnetic pole layer 46 forming the magnetic gap together have the above trapezoidal cross-section, the width of the upper magnetic pole layer 46 defines the magnetic recording track width. Thus, the magnetic recording track width can be decreased by decreasing the width of the upper magnetic pole layer 46.

For example, in FIG. 4B, the width Lu of the upper face of the upper magnetic pole layer 46 is 0.4 μm, the thickness Wu of the upper magnetic pole layer 46 is 0.2 μm, the mean width LL of the gap layer 45 is 0.6 μm, the thickness GL of the gap layer 45 is 0.2 μm, the width Ld of the lower face of the lower magnetic pole layer 44 is 0.8 μm, and the thickness Wd of the lower magnetic pole layer 44 is 0.2 μm. Such a combination of sizes can reduce the magnetic gap width to 1 μm or less.

In the inductive write head 41 of the present invention, the gap depth of the magnetic gap is defined by the distance from the opposing face 152 and the front end of the back insulating layer 80. Thus, the gap depth can be formed as designed.

In the inductive write head 41, as shown in FIGS. 3, 4A, and 4B, the upper magnetic pole layer 46 is deposited in the main portion 51 of the groove 43, and the upper core layer 47 is deposited in the diverging section 61. Thus, the upper magnetic pole layer 46 and the upper core layer 47 are connected at the two tapered sections 47a. Thus, the magnetic flux between the upper core layer 47 and the upper magnetic pole layer 46 is smooth along the tapered sections 47a, and the magnetic flux does not leak to the periphery at the connections between the upper core layer 47 and the upper magnetic pole layer 46.

Moreover, as shown in FIG. 5, the back insulating layer 80 and the coil insulating layer 48 have the sloping face 80a and the sloping face 48a, respectively. Thus, the magnetic flux at the interface between the upper core layer 47 and the upper magnetic pole layer 46 is also smooth and does not leak to the periphery of the interface.

With reference to FIG. 4A, the tilt angle of the coil insulating layer 48, that is, the tilt angle a of the tapered sections 47a is preferably in a range of 10 degrees to 80 degrees with respect to the upper face of the lower core layer 27.

With reference to FIG. 5, the tilt angle of the sloping face 80a of the back insulating layer 80 is preferably in a range of 10 degrees to 80 degrees with respect to the lower core layer 27, and the tilt angle of the sloping face 48a of the coil insulating layer 48 is also preferably in a range of 10 degrees to 80 degrees.

At a tilt angle $\alpha$ of less than 10 degrees, reactance at the sides of the magnetic gap is small. Thus, a fringing magnetic field from the upper core layer 47 is generated in the upper magnetic pole layer 46 and is undesirably recorded onto a magnetic recording medium. A tilt angle a exceeding 80 degrees precludes alignment and development of a photoresist pattern when the upper core layer 47 is formed.

At a tilt angle $\beta$ of less than 10 degrees or at a tilt angle of the sloping face 48a of less than 10 degrees, reactance between the upper core layer 47 and the lower core layer 27 is small. Thus, a fringing magnetic field from the upper core layer 47 to the upper magnetic pole layer 46 increases, resulting in undesirable decrease in recording efficiency. At an angle exceeding 80 degrees, the upper core layer 47 does not have a smooth cross-section. A steep upper core layer 47 causes a large antiferromagnetic field in the vicinity thereof. As a result, the edge of the upper core layer 47 exhibits large reactance which decreases the recording efficiency.

With reference to FIG. 2, a coil 49 is formed on the coil insulating layer 48, and an upper insulating layer 50 covers the coil insulating layer 48 and the coil 49. The coil 49 has a planar spiral pattern. The upper core layer 47 covers the upper magnetic pole layer 46, the sloping face 80a of the back insulating layer 80, the sloping face 48a of the coil insulating layer 48, and the upper insulating layer 50. Thus, the upper core layer 47 indirectly covers the coil 49 in the upper insulating layer 50.

Since the coil insulating layer 48 is provided between the back insulating layer 80 and the coil 49, the upper core layer 47 and the coil 49 are highly insulated from the lower magnetic pole layer 44 and the lower core layer 27. Moreover, the tilt angle of the sloping face 48a is readily controlled by the thickness of the coil insulating layer 48.

Each of the lower magnetic pole layer 44 and the upper magnetic pole layer 46 may be composed of a Ni—Fe alloy; a Ni—Fe—Nb alloy; a Co—Fe alloy; a Co—Fe—Ni alloy; a Co—Fe—Ni—X alloy wherein X is at least one element selected from the group consisting of Mo, Cr, Pd, B, and In; a Co—Zr—Nb alloy; a Co—Hf—Nb alloy; an Fe—M—C alloy wherein M is at least one element selected from the group consisting of Hf, Zr, Ti, V, Nb, Ta, Cr, Mo, and W; a T—X—M—Z—Q alloy wherein T is at least one element of Fe and Co, X is at least one element of Si and Al, M is at least one element selected from the group consisting of Ti, Zr, Hf, V, Ta, Mo, and W, Z is at least one element of C and N, and Q is at least one element selected from the group consisting of Cr, Re, Rh, Ni, Pd, Pt, and Au; a T—Si—Al—M—Z—Q alloy wherein T is at least one element of Fe and Co, M is at least one element of Zr, Hf, Nb, and Ta, Z is at least one element of C and N, and Q is at least one element selected from the group consisting of Cr, Ti, Mo, W, V, Re, Ru, Ni, Pd, Pt, and Au; or an Fe—M—O alloy wherein M is at least one element selected from the group consisting of Hf, Zr, Ti, V, Nb, Ta, Cr, Mo, and W.

These alloys will be described in detail.

The Ni—Fe alloy represented by the formula $Ni_xFe_y$ preferably satisfies the following relationships in which x and y are atomic percent:

$86 \leq x \leq 92, 8 \leq y \leq 14$, and $x+y100$.

This soft magnetic alloy exhibits superior soft magnetism and is suitable for the core of the thin-film magnetic head.

The Ni—Fe—Nb alloy represented by the formula $Ni_xFe_yNb_z$ preferably satisfies the following relationships in which x, y and z are atomic percent:

$76 \leq x \leq 84, 8 \leq y \leq 15, 5 \leq z \leq 12$, and $x+y+z=100$.

This soft magnetic alloy also exhibits superior soft magnetism and is suitable for the core of the thin-film magnetic head. Moreover, the Ni—Fe—Nb alloy exhibits a higher resistivity than that of the Ni—Fe alloy, reduces eddy current loss, and improves high-frequency recording characteristics.

The Co—Fe alloy represented by the formula $Co_xFe_y$ preferably satisfies the following relationships in which x and y are atomic percent:

$86 \leq x \leq 92, 8 \leq y \leq 14$, and $x+y=100$.

This soft magnetic alloy exhibits superior soft magnetism and is suitable for the core of the thin-film magnetic head. Moreover, the Co—Fe alloy exhibits higher saturation magnetic flux density and higher resistivity than those of the Ni—Fe—Nb alloy. Thus, this alloy reduces eddy current loss, increases the recording density, and improves high-frequency recording characteristics.

The Co—Fe—Ni alloy represented by the formula $Co_xFe_yNi_z$ preferably satisfies the following relationships in which x, y and z are weight percent:

$0.1 \leq x\ 15, 38 \leq y\ 60, 40 \leq z \leq 62$, and $x+0y+z=100$.

This soft magnetic alloy also exhibits superior soft magnetism and is suitable for the core of the thin-film magnetic head. Moreover, the Co—Fe—Ni alloy exhibits a higher saturation magnetic flux density and higher resistivity than those of the Ni—Fe—Nb alloy and the Co—Fe alloy, reduces eddy current loss, increases the recording density, and improves high-frequency recording characteristics.

The Co—Fe—Ni—X alloy, in which X is at least one element selected from the group consisting of Mo, Cr, Pd, B, and In, represented by the formula $Co_xFe_yNi_zX_w$ preferably satisfies the following relationships in which x, y, z and w are weight percent:

$0.1 \leq x \leq 15, 38 \leq y \leq 60, 40 \leq z \leq 62, 0.1 \leq w \leq 3$, and $x+y+z+w=100$.

This soft magnetic alloy also exhibits superior soft magnetism and is suitable for the core of the thin-film magnetic head. Moreover, this Co—Fe—Ni—X alloy exhibits higher resistivity than that of the Co—Ni alloy, and significantly reduces eddy current loss which is advantageous for high-frequency recording. In addition, the Co—Fe—Ni—X alloy exhibits a saturation magnetic flux density which is comparable to that of the Co—Fe—Ni alloy and is suitable for high-density recording.

The Co—Zr—Nb alloy represented by the formula $Co_xZr_yNb_z$ preferably satisfies the following relationships in which x, y, and z are atomic percent:

$1.5 \leq y \leq 13$, $6.5 \leq z \leq 15$, $1 \leq (y/z) \leq 2.5$, and $x+y+z=100$.

This soft magnetic alloy exhibits significantly superior soft magnetism and is suitable for the core of the thin-film magnetic head, since this alloy does not exhibit crystalline magnetic anisotropy when the core is deposited.

The Co—Hf—Nb alloy represented by the formula $Co_x$-$Hf_yNb_z$ preferably satisfies the following relationships in which x, y, and z are atomic percent:

$1.5 \leq y \leq 13$, $6.5 \leq z \leq 15$, $1 \leq (y/z) \leq 2.5$, and $x+y+z=100$.

This soft magnetic alloy also exhibits significantly superior soft magnetism and is suitable for the core of the thin-film magnetic head, since this alloy does not exhibit crystalline magnetic anisotropy when the core is deposited.

The Fe—M—C alloy is composed of a crystalline phase essentially consisting of Fe and a crystalline phase of carbide of at least one element selected from the group consisting of Hf, Zr, Ti, V, Nb, Ta, Cr, Mo, and W. On the whole, the alloy is preferably composed of fine crystallites having an average crystal grain size of 40 nm or less. Preferably, the average crystal grain size d of the carbide and the average crystal grain size D of the Fe crystal satisfy the relationship $0.05 \leq d/D \leq 0.4$.

More preferably, the Fe—M—C alloy represented by the formula $Fe_xM_yC_z$ preferably satisfies the following relationships in which x, y, and z are atomic percent:

$50 \leq x \leq 96$, $2 \leq y \leq 30$, $0.5 \leq z \leq 25$, and $x+y+z=100$.

This soft magnetic alloy also exhibits significantly superior soft magnetism and is suitable for the core of the thin-film magnetic head, since crystalline magnetic anisotropy is extremely low due to fine crystal grains which are formed by precipitation of M carbide. Since this alloy exhibits a higher saturation magnetic flux density and a lower coercive force than those of the above alloys, the soft magnetism is more satisfactory and is suitable for high-density recording. Moreover, the precipitated M carbide contributes to improved heat resistance.

The T—X—M—Z—Q alloy is composed of a crystalline phase essentially consisting of Fe or Co and a crystalline phase of a carbide or a nitride of at least one element selected from the group consisting of Ti, Zr, Hf, V, Ta, Mo, and W. On the whole, the alloy is preferably composed of fine crystallites having an average crystal grain size of 40 nm or less. Preferably, the average crystal grain size d of the carbide or nitride and the average crystal grain size D of the Fe or Co crystal satisfy the relationship $0.05 \leq d/D \leq 0.4$.

More preferably, the T—X—M—Z—Q alloy represented by the formula $T_aX_bM_cZ_dQ_e$, in which T is at least one element of Fe and Co, X is at least one element of Si and Al, and M is at least one element selected from the group consisting of Ti, Zr, Hf, V, Ta, Mo, and W, preferably satisfies the following relationships in which a, b, c, d, and e are atomic percent:

$0 \leq a \leq 25$, $0 \leq b \leq 25$, $1 \leq c \leq 10$, $5 \leq d \leq 15$, $0 \leq e \leq 10$, and $a+b+c+d+e=100$.

This soft magnetic alloy also exhibits significantly superior soft magnetism and is suitable for the core of the thin-film magnetic head. Moreover, the X component increases the resistivity of the alloy to a level of 120 $\mu\Omega$cm or more, which is higher than that of the Fe—M—C alloy. Thus, this alloy exhibits small eddy current loss and is suitable for high-frequency recording. The X component contributes to improved corrosion and oxidation resistance compared to the Fe—M—C alloy.

The T—Si—Al—M—Z—Q alloy is composed of a body centered cubic fine crystalline phase essentially consisting of Fe or Co and having an average crystal grain size of 40 nm or less and a crystalline phase of a carbide or a nitride of at least one element selected from the group consisting of Ti, Zr, Hf, Nb, and Ta which is precipitated at the grain boundaries of the fine crystalline phase, wherein at least one element of Si and Al and at least one element selected from the group consisting of Cr, Ti, Mo, W, V, Re, Ru, Rh, Ni, Pd, Pt, and Au are dissolved in the body centered cubic crystalline phase.

More preferably, the T—Si—Al—M—Z—Q alloy represented by the formula $T_aSi_bAl_cM_dZ_eQ_f$, in which T is at least one element of Fe and Co, M is at least one element of Zr, Hf, Nb, and Ta, Z is at least one element of C and N, and Q is at least one element selected from the group consisting of Cr, Ti, Mo, W, V, Re, Ru, Ni, Pd, Pt, and Au, preferably satisfies the following relationships in which a, b, c, d, e, and f are atomic percent:

$8 \leq b \leq 15$, $0 \leq c \leq 10$, $1 \leq d \leq 10$, $1 \leq e \leq 10$, $0 \leq f \leq 15$, and $a+b+c+d+e+f=100$.

This soft magnetic alloy also exhibits superior soft magnetism and is suitable for the core of the thin-film magnetic head. Moreover, this alloy containing both Si and Al has an absolute value of magnetostriction which is smaller than that of the T—X—M—Z—Q alloy. Thus, this alloy exhibits decreased internal stress and is resistant to changes in temperature.

The Fe—M—O alloy represented by the formula $Fe_aM_bO_c$, in which M is at least one element selected from the group consisting of Hf, Zr, Ti, V, Nb, Ta, Cr, Mo, and W, preferably satisfies the following relationships in which a, b, and c are atomic percent:

$50 \leq a \leq 70$, $5 \leq b \leq 30$, $10 \leq c \leq 30$, and $a+b+c=100$.

This soft magnetic alloy also exhibits significantly superior soft magnetism, that is, low coercive force, and is suitable for the core of the thin-film magnetic head, since this alloy does not exhibit crystalline magnetic anisotropy. Moreover, this alloy exhibits a higher resistivity of 400 to $2 \times 10^5$ $\mu\Omega$cm, contributes to a significant decrease in eddy current loss, and improves recording characteristics in high-frequency regions of several tens of MHz.

The lower magnetic pole layer 44 and the upper magnetic pole layer 46 may be composed of one of an FeNi alloy, an Fe-enriched FeNi alloy, and a CoFeNi alloy. These alloys exhibit superior soft magnetism and are suitable for the core of the thin-film magnetic head 1. Moreover, these alloys can be deposited by an electroplating process using the lower core layer 27 as an electrode.

The insulating layer 42 is preferably composed of at least one material selected from the group consisting of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN. The insulating layer 42 may have a single-layer configuration or a multi-layer configuration of these materials. When the insulating layer 42 is not etched, the insulating layer 42 may be $B_4C$, sialon, or SIC.

The gap layer 45 is preferably composed of at least one material selected from the group consisting of Au, Pt, Rh, Pd, Ru, Cr, NiMo alloys, NiW alloys, NiP alloys, and NiPd alloys. The gap layer 45 may have a single-layer configuration or a multi-layer configuration of these materials. Since these materials are nonmagnetic materials and are not magnetized, these can be preferably used in the gap layer of the thin-film magnetic head 1.

The gap layer 45 may be composed of an inorganic insulating material. The inorganic insulating material can improve insulation between the lower magnetic pole layer 44 and the upper magnetic pole layer 46 and between the lower core layer 27 and the upper core layer 47.

When electroplating is not employed, the gap layer 45 is preferably composed of at least one material selected from the group consisting of AlO, $Al_2O_3$, SiO, $SiO_2$, $Ta_2O_5$, TiO, AlN, AlSiN, TiN, SiN, $Si_3N_4$, NiO, WO, $WO_3$, BN, CrN, $B_4C$, sialon, and SiC. The gap layer 45 may have a single-layer configuration or a multi-layer configuration of these materials.

The layer composed of such an inorganic material can be deposited by a RF sputtering process or an ion beam sputtering process regardless of the conductivity thereof. These sputtering processes exhibit high reproducibility and a uniform distribution of the film thickness. Since the thickness of an insulating material on an actual substrate can be determined by a noncontact mode using an optical thickness meter, quality control during mass production can be facilitated.

In the inductive write head 41, a recording current is applied to the coil 49 to generate magnetic fields in the upper core layer 47 and the lower core layer 27. These magnetic fields are applied to the upper magnetic pole layer 46 and the lower magnetic pole layer 44, and leak from the gap layer 45 as a fringing magnetic field. The fringing magnetic field magnetizes a magnetic recording medium to record signals.

A method for making the thin-film magnetic head in accordance with the present invention will now be described with reference to FIGS. 6 and 27.

In summary, the upper face of the lower core layer 27 is planarized by polishing, and the lower magnetic pole layer 44, the gap layer 45, and the upper magnetic pole layer 46 are deposited on the lower core layer 27 to connect the lower core layer 27 and the lower magnetic pole layer 44. The lower magnetic pole layer 44, the gap layer 45, and the upper magnetic pole layer 46 are removed in the back region Y other so that these layers partly remain at the front end of the back region Y and the lower core layer 27 is exposed at the back end of the back region Y. The insulating layer 42 is deposited on the exposed lower core layer 27 in the back region Y to form the groove 43. The gap depth which is substantially parallel to the opposing face 152 is provided to the upper magnetic pole layer 46. The back insulating layer 80 and the coil insulating layer 48 are deposited on the gap layer 45 in the back region Y, and the coil 49 is formed in the back region Y. Moreover, the upper core layer 47 is formed so as to connect to the upper magnetic pole layer 46 in the magnetic pole end region X and to cover a part of the coil 49 in the back region Y.

Figure 6:
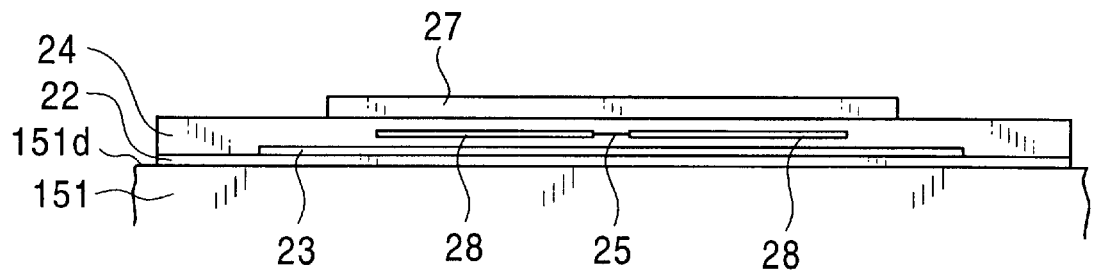
FIG. 6 is a front view for illustrating a method for making the combined thin-film magnetic head in accordance with the first embodiment.

In more detail, with reference to FIG. 6, the insulating layer 22, the lower shielding layer 23, the magnetoresistive element 25, the electrodes 28, and the read gap layer 24 are formed in that order on the trailing end 151d of the slider 151, and the lower-core layer (upper shielding layer) 27 is formed on the read gap layer 24.

Figure 7:
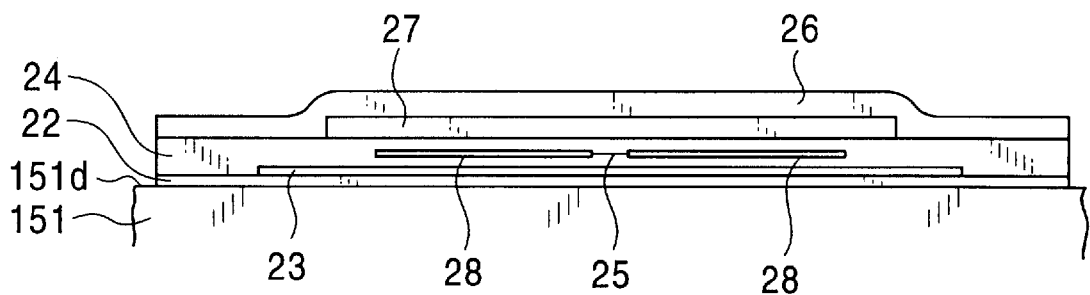
FIG. 7 is a front view for illustrating a method for making the combined thin-film magnetic head in accordance with the first embodiment.

With reference to FIG. 7, the planarization insulating layer 26 is formed over the read gap layer 24 and the lower core layer 27.

Figure 8:
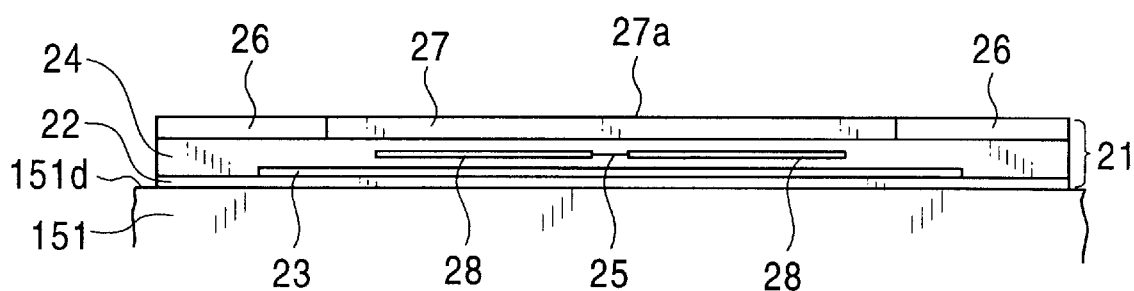
FIG. 8 is a front view for illustrating a method for making the combined thin-film magnetic head in accordance with the first embodiment.

With reference to FIG. 8, the upper face of the planarization insulating layer 26 is polished to expose an upper face 27a of the lower core layer 27, and the upper face 27a is polished to be planarized, preferably by a chemical-mechanical polishing (CMP) process. The surface roughness Ra of the upper face 27a is preferably in a range of 0.001 μm to 0.015 μm. The magnetic read head 21 is thereby prepared.

Since the upper face 27a of the lower core layer 27 is planarized, the insulating layer deposited thereon by the subsequent step is also planarized. As a result, the lower magnetic pole layer 44, the gap layer 45, and the upper magnetic pole layer 46 constituting the magnetic gap can be precisely formed by anisotropic etching as described below, so that a narrow magnetic recording track width can be formed.

Figure 9:
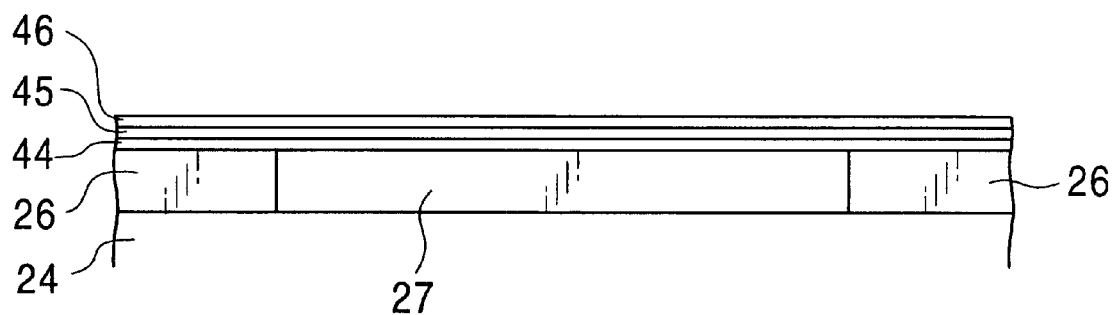
FIG. 9 is a front view for illustrating a method for making the combined thin-film magnetic head in accordance with the first embodiment.
Figure 10:
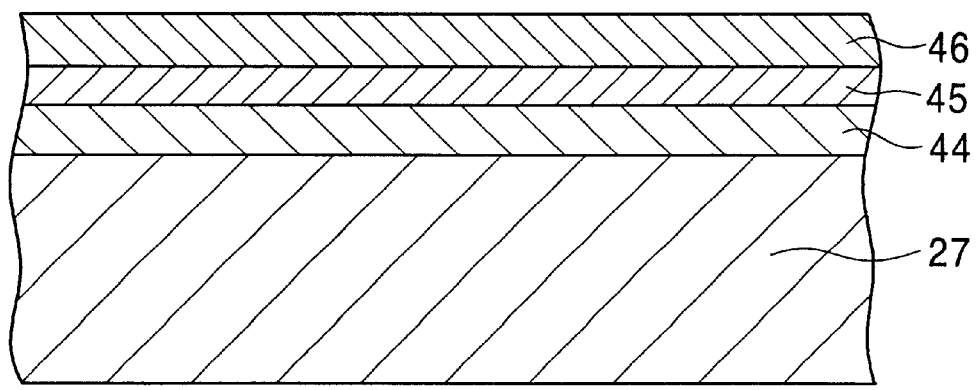
FIG. 10 is a side cross-sectional view for illustrating a method for making the combined thin-film magnetic head in accordance with the first embodiment.

With reference to FIGS. 9 and 10, the lower magnetic pole layer 44, the gap layer 45, and the upper magnetic pole layer 46 are deposited in that order over the planarization insulating layer 26 and the lower core layer 27 by a sputtering process, a physical vapor deposition (PVD) process, or an ion beam deposition (IBD) process.

As described above, each of the lower magnetic pole layer 44 and the upper magnetic pole layer 46 may be composed of a Ni—Fe alloy; a Ni—Fe—Nb alloy; a Co—Fe alloy; a Co—Fe—Ni alloy; a Co—Fe—Ni—X alloy wherein X is at least one element selected from the group consisting of Mo, Cr, Pd, B, and In; a Co—Zr—Nb alloy; a Co—Hf—Nb alloy; an Fe—M—C alloy wherein M is at least one element selected from the group consisting of Hf, Zr, Ti, V, Nb, Ta, Cr, Mo, and W; a T—X—M—Z—Q alloy wherein T is at least one element of Fe and Co, X is at least one element of Si and Al, M is at least one element selected from the group consisting of Ti, Zr, Hf, V, Ta, Mo, and W, Z is at least one element of C and N. and Q is at least one element selected from the group consisting of Cr, Re, Rh, Ni, Pd, Pt, and Au; a T—Si—Al—M—Z—Q alloy wherein T is at least one element of Fe and Co, M is at least one element of Zr, Hf, Nb, and Ta, Z is at least one element of C and N, and Q is at least one element selected from the group consisting of Cr, Ti, Mo, W, V, Re, Ru, Ni, Pd, Pt, and Au; or an Fe—M—O alloy wherein M is at least one element selected from the group consisting of Hf, Zr, Ti, V, Nb, Ta, Cr, Mo, and W.

In a preferred-embodiment, the thickness of the lower magnetic pole layer 44 is at least 0.1 μm and is at least 0.5 times the thickness of the gap layer 45. Specifically, the thickness of the lower magnetic pole layer 44 is preferably in a range of 0.1 μm to 0.5 μm and more preferably 0.2 μm, the thickness of the gap layer 45 is preferably in a range of 0.1 μm to 0.3 μm and more preferably approximately 0.2 μm, and the thickness of the upper magnetic pole layer 46 is preferably 0.1 μm to 1.0 μm and more preferably 0.2 μm.

An RF sputtering process using a magnetron facilitates deposition of any materials. A DC sputtering process using a magnetron is suitable for deposition of a metallic material. The use of the magnetron facilitates sputtering at a low temperature of 10° C. or less. Thus, the magnetic read head 21 which has been formed is substantially not damaged during the sputtering process.

Figure 11:
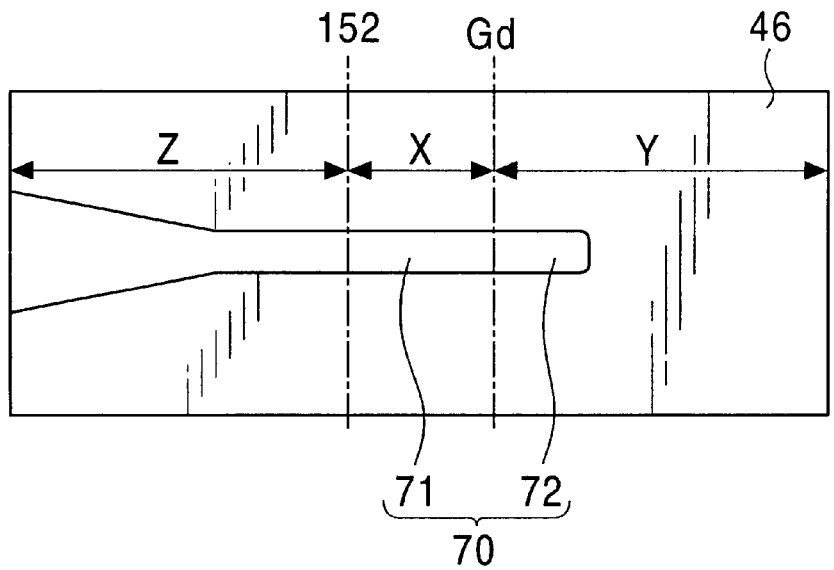
FIG. 11 is a plan view for illustrating a method for making the combined thin-film magnetic head in accordance with the first embodiment.
Figure 12:
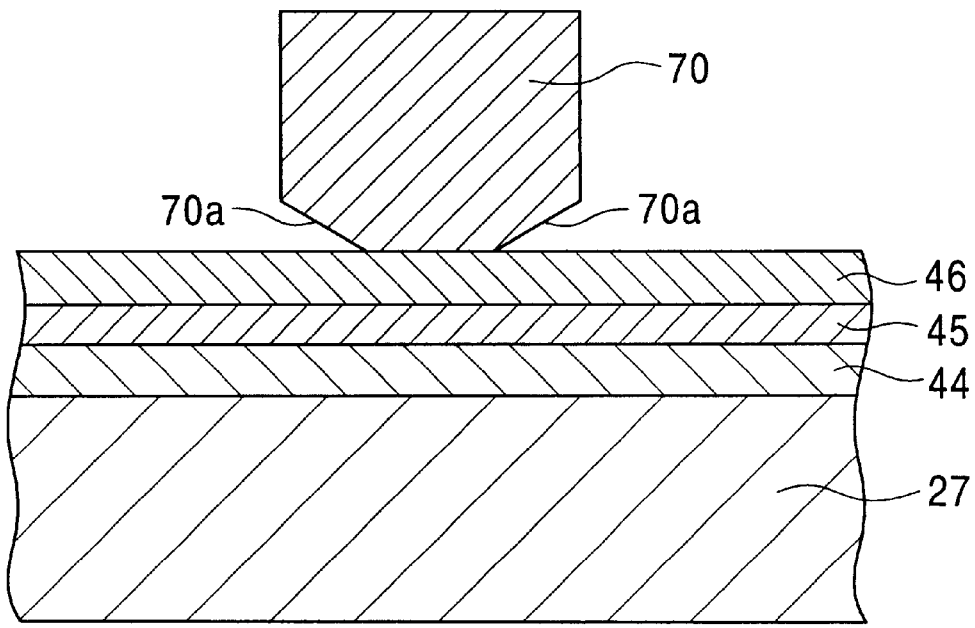
FIG. 12 is a front cross-sectional view for illustrating a method for making the combined thin-film magnetic head in accordance with the first embodiment.

With reference to FIGS. 11 and 12, a mask layer 70 is formed on the upper magnetic pole layer 46 so as to extend over the left (Z region) of the opposing face 152, the magnetic pole end region X, and the back region Y. The mask layer 70 is patterned by a photolithographic process to form a main mask portion 71 in the magnetic pole end region X and an adjoining mask portion 72 in the back region Y.

The mask layer 70 has two notches 70a at both bottom sides. These notches 70a are formed by the subsequent anisotropic etching step.

The mask layer 70 has a thickness of 0.6 μm to 5.0 μm. Moreover, the width of the mask layer 70 at the opposing face 152 is set to be 1 μm or less and to be substantially the same as the magnetic gap width.

Preferably, the mask layer 70 is a photoresist layer. The photoresist layer may be a novolak-resin positive photoresist, a rubber-based negative photoresist, or a photoresist sensitive to far ultraviolet rays, electron beams, X-rays, or ion beams.

Preferably, the positive photoresist comprises one of the compounds represented by the following formulae (1) and (2):

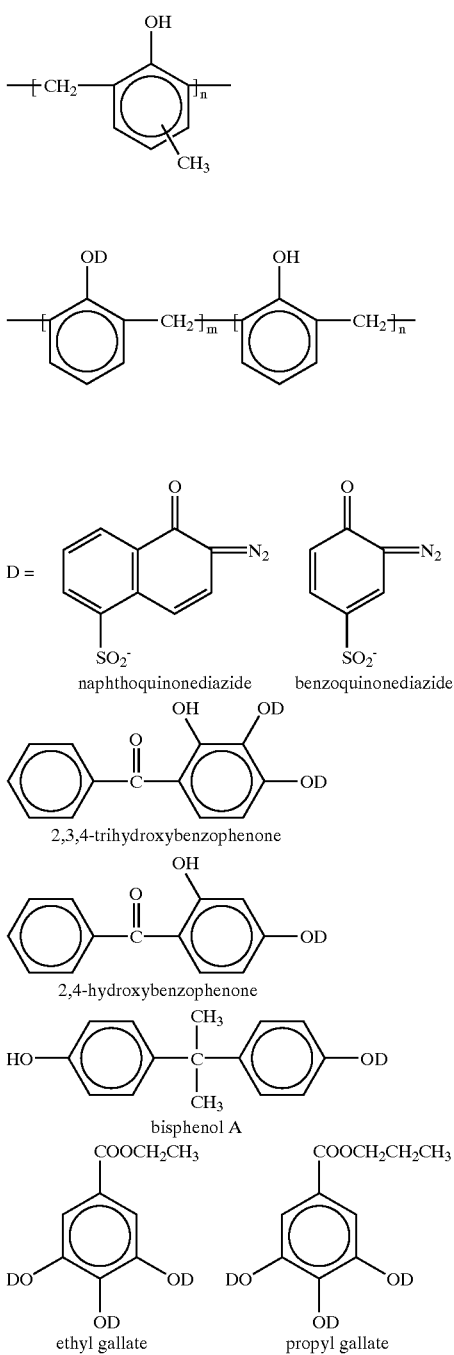

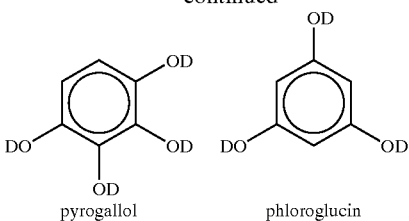

Figure 13:
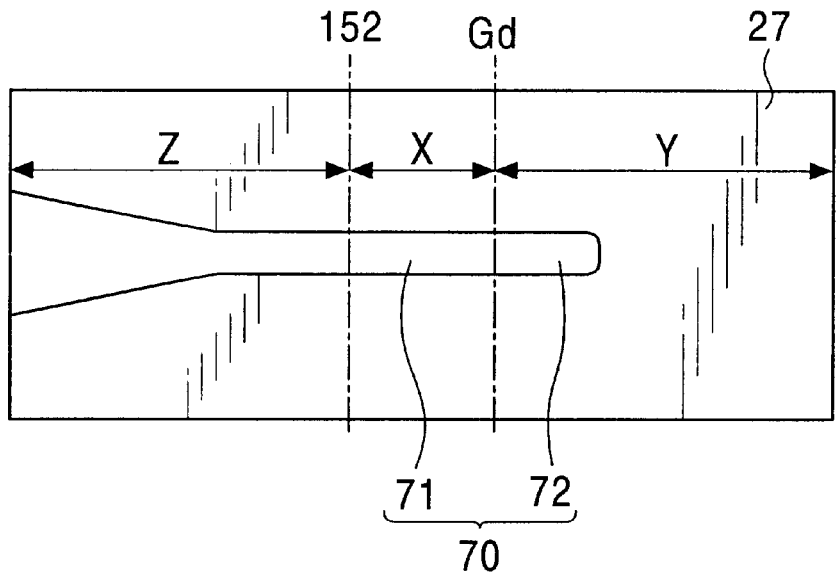
FIG. 13 is a plan view for illustrating a method for making the combined thin-film magnetic head in accordance with the first embodiment.
Figure 14:
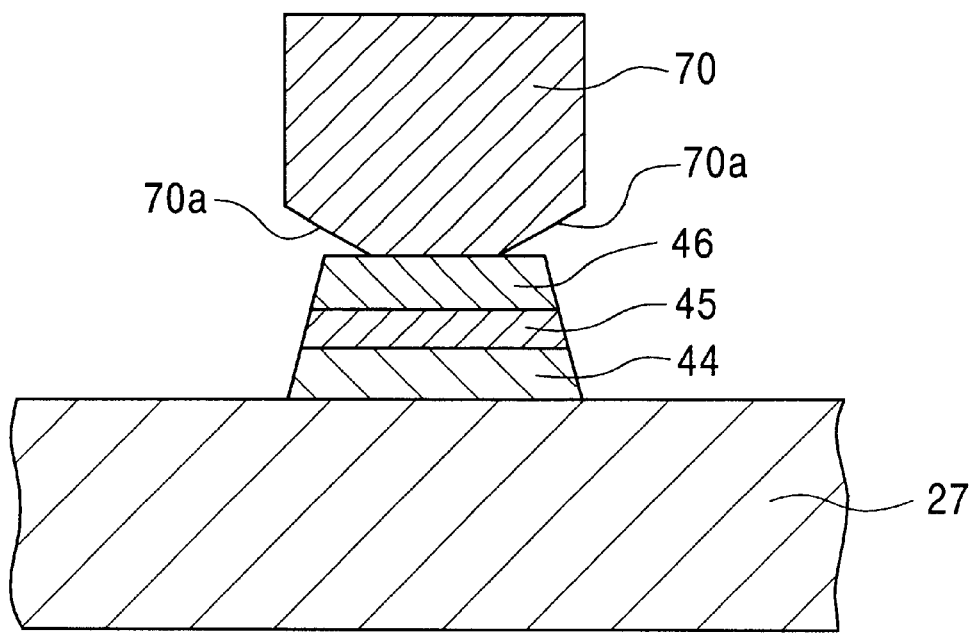
FIG. 14 is a front view for illustrating a method for making the combined thin-film magnetic head in accordance with the first embodiment.

With reference to FIGS. 13 and 14, the lower magnetic pole layer 44, the gap layer 45, and the upper magnetic pole layer 46 are subjected to anisotropic etching to expose the lower core layer 27. A preferable anisotropic etching process is a physical ion beam etching (ion milling) process. The irradiation angle θ of the ion beams in the etching process is preferably in a range of $0° \leq \theta \leq 40°$.

When the lower magnetic pole layer 44, the gap layer 45, and the upper magnetic pole layer 46 are shaped by anisotropic etching, the accuracy of the width to the thickness can be improved without the occurrence of side etching.

The ion milling process using Ar ions can etch a variety of materials and thus can simultaneously etch the lower magnetic pole layer 44, the gap layer 45, and the upper magnetic pole layer 46, which are composed of different materials. Since the ion milling process has high anisotropy, an exact angle can be set.

As shown in FIG. 14, by the notches 70*a* of the mask layer 70, the lower magnetic pole layer 44, the gap layer 45, and the upper magnetic pole layer 46 are etched to have a magnetic gap width. As a result, as shown in FIG. 4B, the difference 2ΔL between the length Lu of the upper face of the lower magnetic pole layer 44 and the length Ld of the lower face of the upper magnetic pole layer 46 can be set to be equal to or less than the thickness GL of the gap layer 45.

Figure 15:
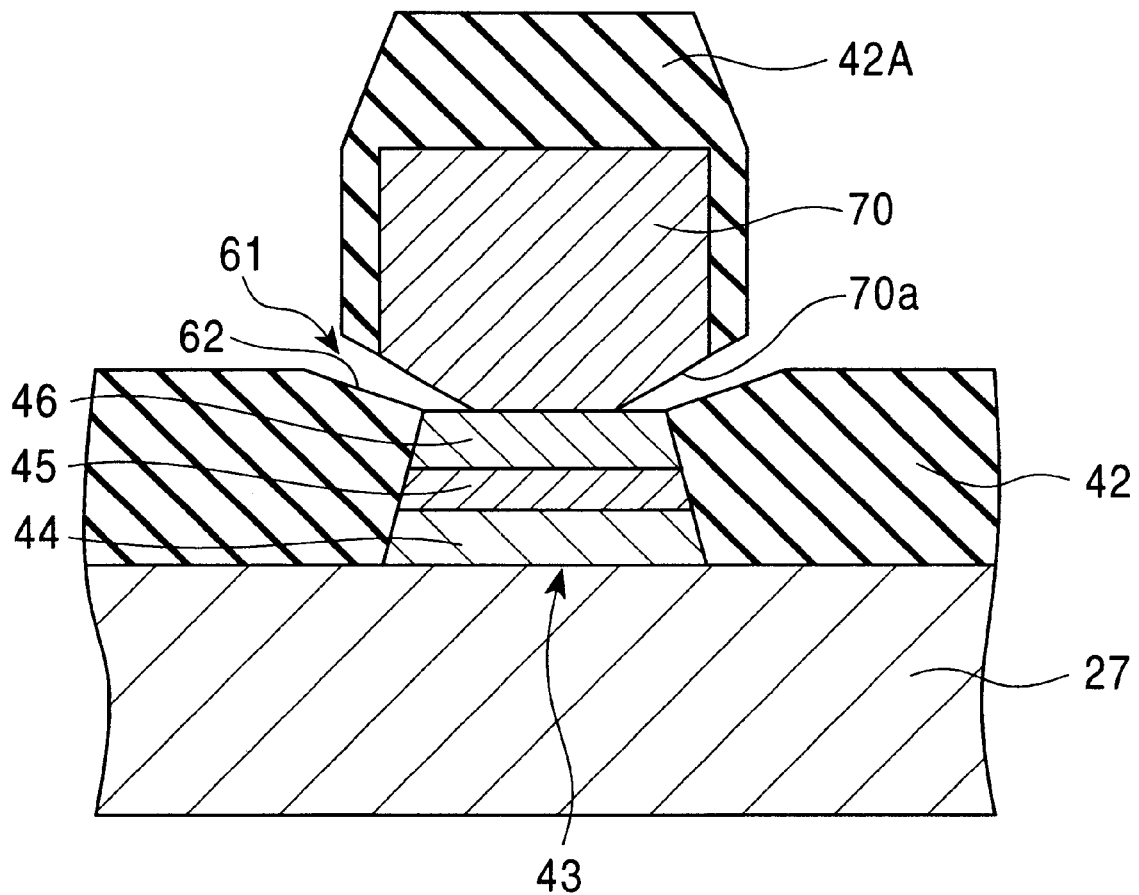
FIG. 15 is a front cross-sectional view for illustrating a method for making the combined thin-film magnetic head in accordance with the first embodiment.
Figure 16:
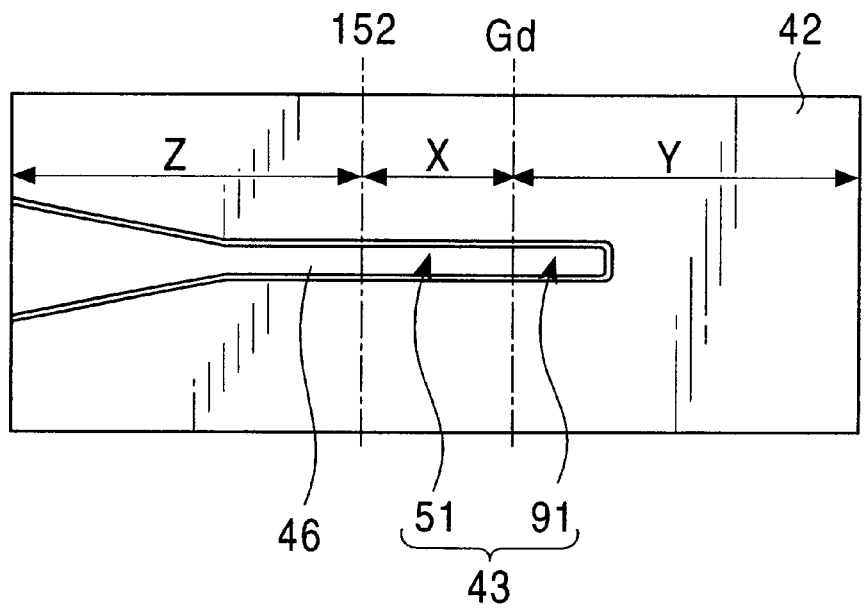
FIG. 16 is a plan view for illustrating a method for making the combined thin-film magnetic head in accordance with the first embodiment.
Figure 17:
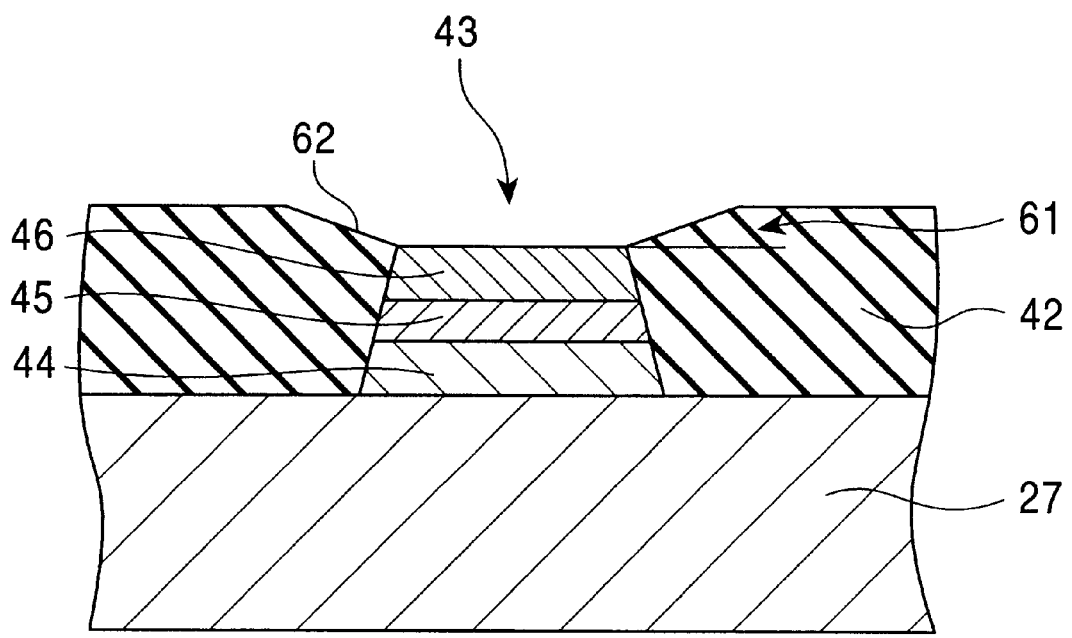
FIG. 17 is a front cross-sectional view for illustrating a method for making the combined thin-film magnetic head in accordance with the first embodiment.
Figure 18:
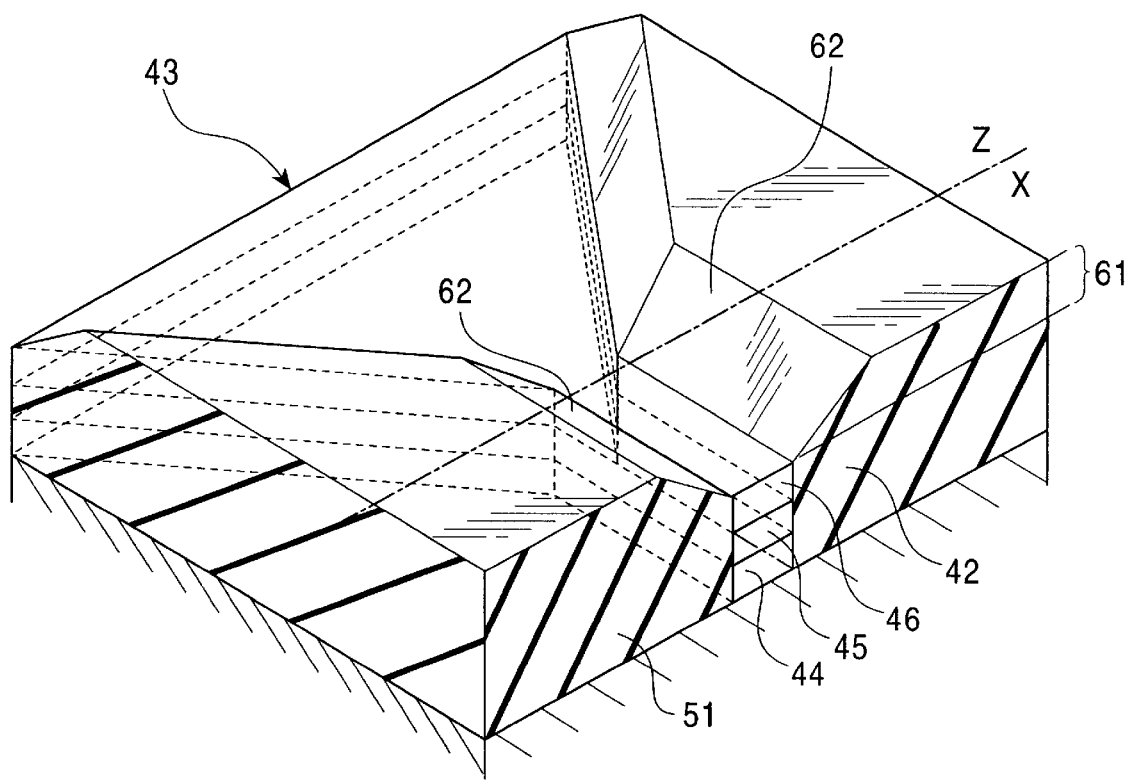
FIG. 18 is a perspective view for illustrating a method for making the combined thin-film magnetic head in accordance with the first embodiment.
Figure 19:
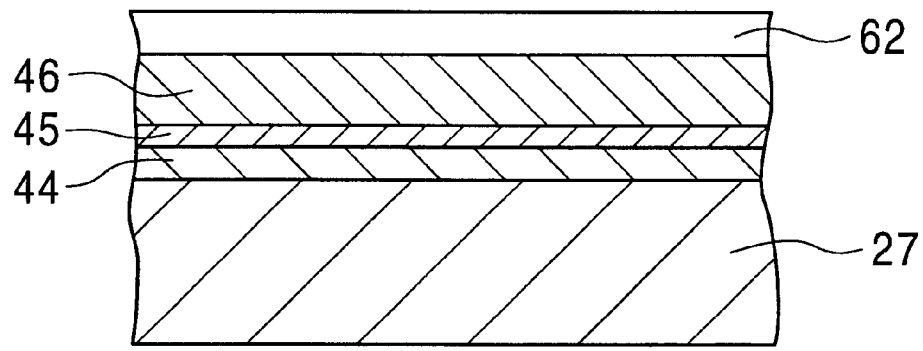
FIG. 19 is a side cross-sectional view for illustrating a method for making the combined thin-film magnetic head in accordance with the first embodiment.

With reference to FIG. 15, the insulating layer 42 is formed, without removing the mask layer 70, on the upper magnetic pole layer 46, preferably, by an anisotropic sputtering process, an ion beam sputtering process, an ion beam deposition process, a long slow sputtering process, or a collimated sputtering process. A deposited layer 42A is formed on the mask layer 70 and the outwardly sloping side-walls 62 are formed on the insulating layer 42 at the boundaries to the upper magnetic pole layer 46, due to the notches 70*a*.

The mask layer 70 with the deposited layer 42A is removed using acetone or N-methyl-2-pyrrolidone (NMP).

With reference to FIGS. 16 to 19, the groove 43 having the main portion 51 and the adjoining portion 91 is formed in the insulating layer 42. Moreover, the diverging section 61 having the outwardly sloping side-walls 62 is formed in the insulating layer 42.

Figure 20:
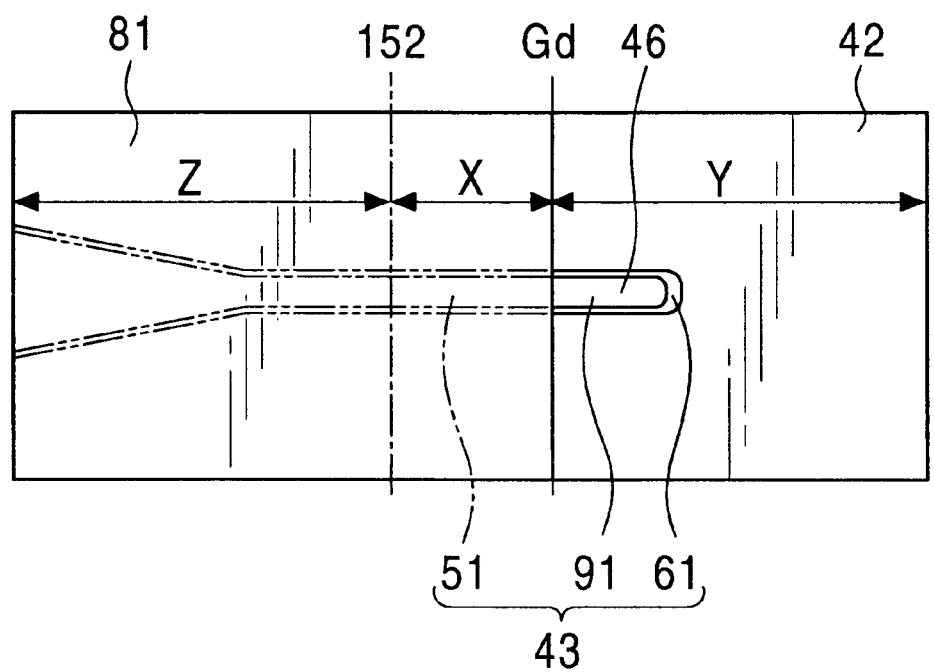
FIG. 20 is a plan view for illustrating a method for making the combined thin-film magnetic head in accordance with the first embodiment.
Figure 21:
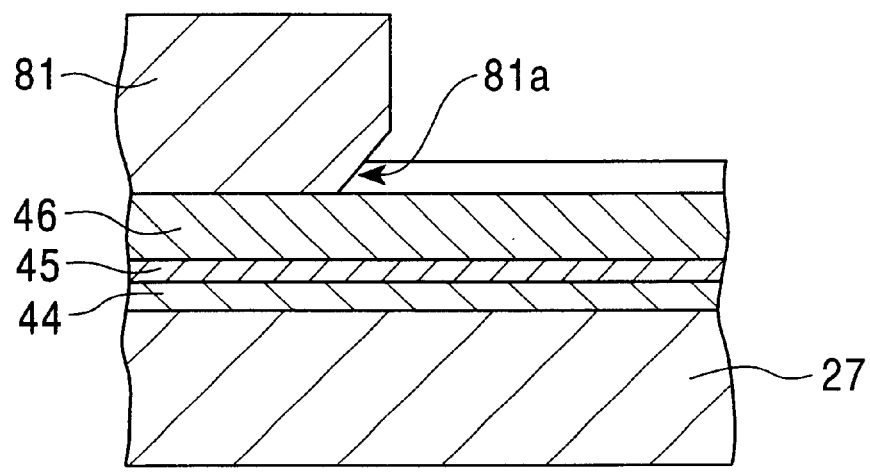
FIG. 21 is a side cross-sectional view for illustrating a method for making the combined thin-film magnetic head in accordance with the first embodiment.

With reference to FIGS. 20 and 21, an upper mask layer 81 is formed on the upper magnetic pole layer 46 by a photolithographic process so as to cover the magnetic pole end region X of the groove 43. The bottom of the back insulating layer 80 has an indented portion 81*a* at the boundary, defining the gap depth, between the magnetic pole end region X and the back region Y. The shape of the indented portion 81*a* is defined by the subsequent anisotropic etching process.

The upper mask layer 81 preferably has a thickness of 0.6 μm to 5.0 μm and preferably is a photoresist layer. The photoresist layer may be a positive photoresist, a negative photoresist, or a photoresist sensitive to far ultraviolet rays, electron beams, X-rays, or ion beams.

Figure 22:
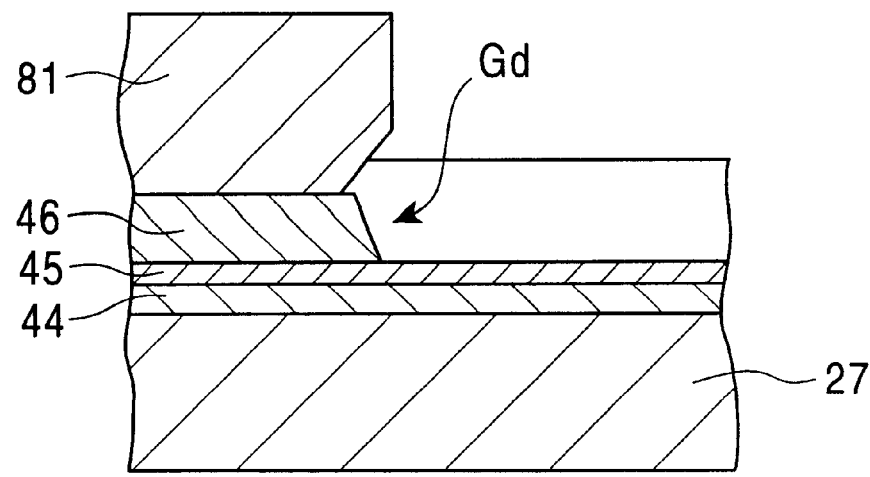
FIG. 22 is a side cross-sectional view for illustrating a method for making the combined thin-film magnetic head in accordance with the first embodiment.

With reference to FIG. 22, the back region Y of the upper magnetic pole layer 46 is removed by a physical ion beam etching (ion milling) process to form the gap depth Gd. The boundary between the magnetic pole end region X and the back region Y is etched in a direction substantially perpendicular to the upper face of the lower core layer 27 due to the indented portion 81a provided at the bottom of the upper mask layer 81. As a result, the gap depth Gd is substantially parallel to the opposing face 152 at the edge of the upper magnetic pole layer 46 in the magnetic pole end region X.

The irradiation angle θ of the ion beams in the etching process is preferably in a range of $0° \leq \theta \leq 40°$ with respect to the vertical direction in FIG. 21.

Figure 23:
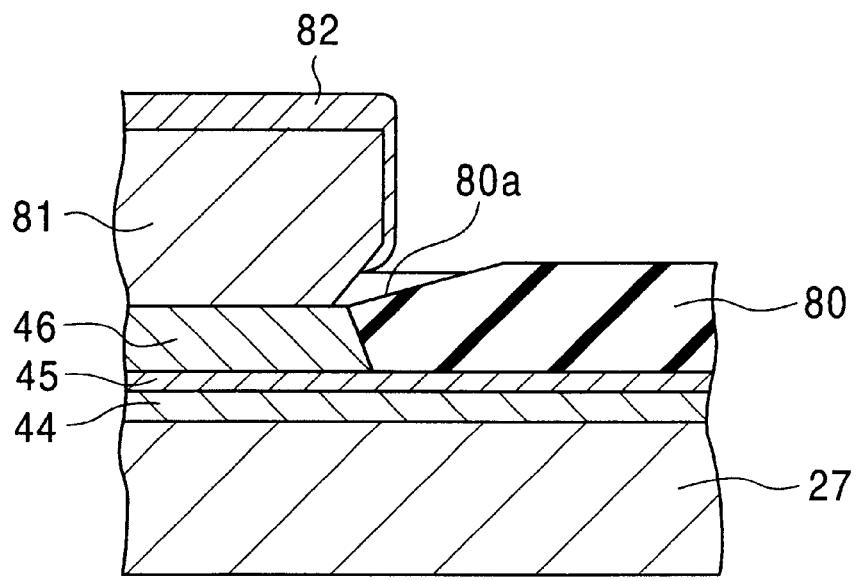
FIG. 23 is a side cross-sectional view for illustrating a method for making the combined thin-film magnetic head in accordance with the first embodiment.

With reference to FIG. 23, the back insulating layer 80 is formed preferably by an anisotropic sputtering process or an ion beam sputtering process without removing the upper mask layer 81. A deposited layer 82 is formed on the upper mask layer 81, and the sloping face 80a is formed on the back insulating layer 80 at the boundary to the upper magnetic pole layer 46.

The upper mask layer 81 with the deposited layer 82 is removed using acetone or N-methyl-2-pyrrolidone (NMP).

Figure 24:
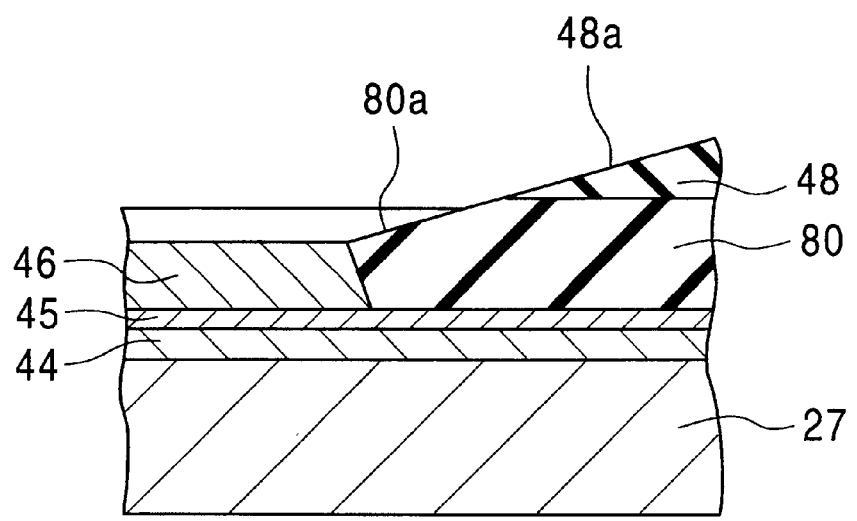
FIG. 24 is a side cross-sectional view for illustrating a method for making the combined thin-film magnetic head in accordance with the first embodiment.

With reference to FIG. 24, the coil insulating layer 48 is deposited on the back insulating layer 80. The coil insulating layer 48 has the sloping face 48a extending from the sloping face 80a. The coil insulating layer 48 may not be provided.

Figure 25:
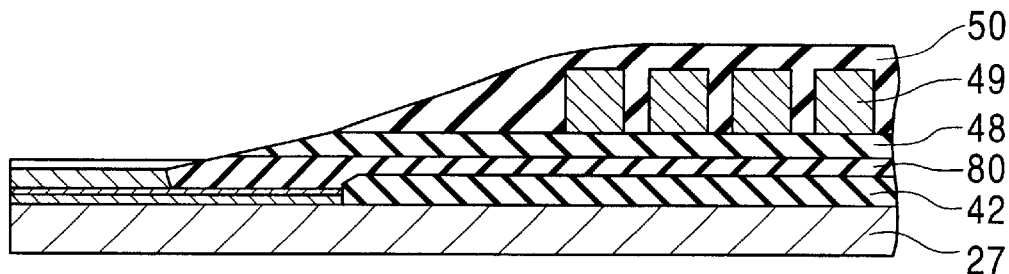
FIG. 25 is a side cross-sectional view for illustrating a method for making the combined thin-film magnetic head in accordance with the first embodiment.

With reference to FIG. 25, the coil 49 is formed on the coil insulating layer 48 and the upper insulating layer 50 is deposited to embed the coil 49.

Figure 26:
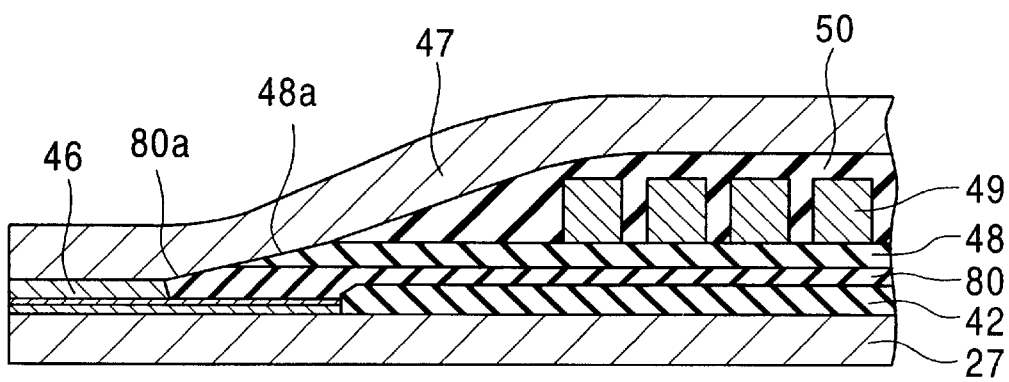
FIG. 26 is a side cross-sectional view for illustrating a method for making the combined thin-film magnetic head in accordance with the first embodiment.
Figure 27:
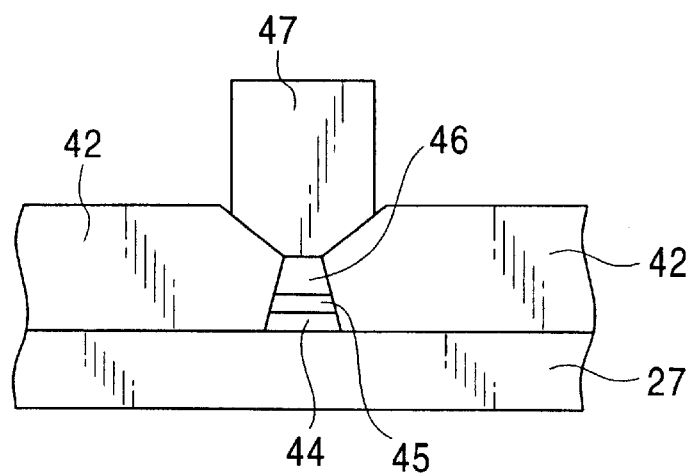
FIG. 27 is a front view for illustrating a method for making the combined thin-film magnetic head in accordance with the first embodiment.

With reference to FIG. 26, the upper core layer 47 is formed over the upper magnetic pole layer 46, the sloping face 80a of the back insulating layer 80, the sloping face 48a of the coil insulating layer 48, and the upper insulating layer 50 so as to entirely cover the upper magnetic pole layer 46, as shown in FIG. 27.

The product is cut at the opposing face 152 and the opposing face 152 is polished to form the thin-film magnetic write head 41 of the present invention.

In the inductive write head 41, the magnetic recording track is formed of the composite of the lower magnetic pole layer 44, the gap layer 45, the upper magnetic pole layer 46, and the back insulating layer 80, and the lower magnetic pole layer 44, the gap layer 45, and the upper magnetic pole layer 46 are exposed at the opposing face 152. Thus, the magnetic recording track width at the opposing face 152 is equal to the width of the upper magnetic pole layer 46 so that the magnetic gap width is reduced. By the fringing magnetic field from the magnetic gap, magnetic recording can be effectively performed on a magnetic recording medium.

The gap depth of the magnetic gap is defined by the distance from the opposing face 152 to the front end of the upper magnetic pole layer 46 in the back region Y. The position and the shape of the front end of the upper magnetic pole layer 46 can be determined by etching the upper mask layer 81 after the formation of the groove 43. Thus, the gap depth is precisely determined.

In the inductive write head 41, the lower magnetic pole layer 44, the gap layer 45, and the upper magnetic pole layer 46 are deposited and then etched using the mask layer 70. Thus, a variety of materials can be used as the lower magnetic pole layer 44 and the upper magnetic pole layer 46, as described above.

When the insulating layer 42 is formed by a sputtering process using the mask layer 70, the inductive write head 41, the adjoining portion 91, and the diverging section 61 of the groove 43 can be simultaneously formed. Thus, the forming process can be simplified, and the width can be exactly controlled.

In the inductive write head 41, the tapered sections 47a formed on the upper core layer 47 smoothes the magnetic flux between the upper core layer 47 and the upper magnetic pole layer 46 and prevents the fringing of the magnetic flux between the upper magnetic pole layer 46 and the upper core layer 47.

Moreover, the sloping face 80a and the sloping face 48a on the back insulating layer 80 and the coil insulating layer 48, respectively, smooth the magnetic flux between the upper core layer 47 and the upper magnetic pole layer 46 and prevent the leakage of the magnetic flux between the upper core layer 47 and the upper magnetic pole layer 46.

The width of the mask layer 70 is set to be 1 μm or less and the notches 70a are provided. Thus, the magnetic gap width can be set to be 1 μm or less.

When the mask layer 70 and the upper mask layer 81 are removed, the deposited layers 42A and 82 on the mask layer 70 and the upper mask layer 81, respectively, can also be simultaneously removed. Thus, the manufacturing process can be simplified.

A second embodiment of the thin-film magnetic head and a method for making the same in accordance with the present invention will now be described with reference to the drawings.

FIGS. 28, 29, 30, 31 are a perspective view, two side cross-sectional views, and a plan view, respectively, of the thin-film magnetic head in the second embodiment. The same components as those in the first embodiment are referred to with the same reference numerals and detailed description thereof is omitted.

Figure 28:
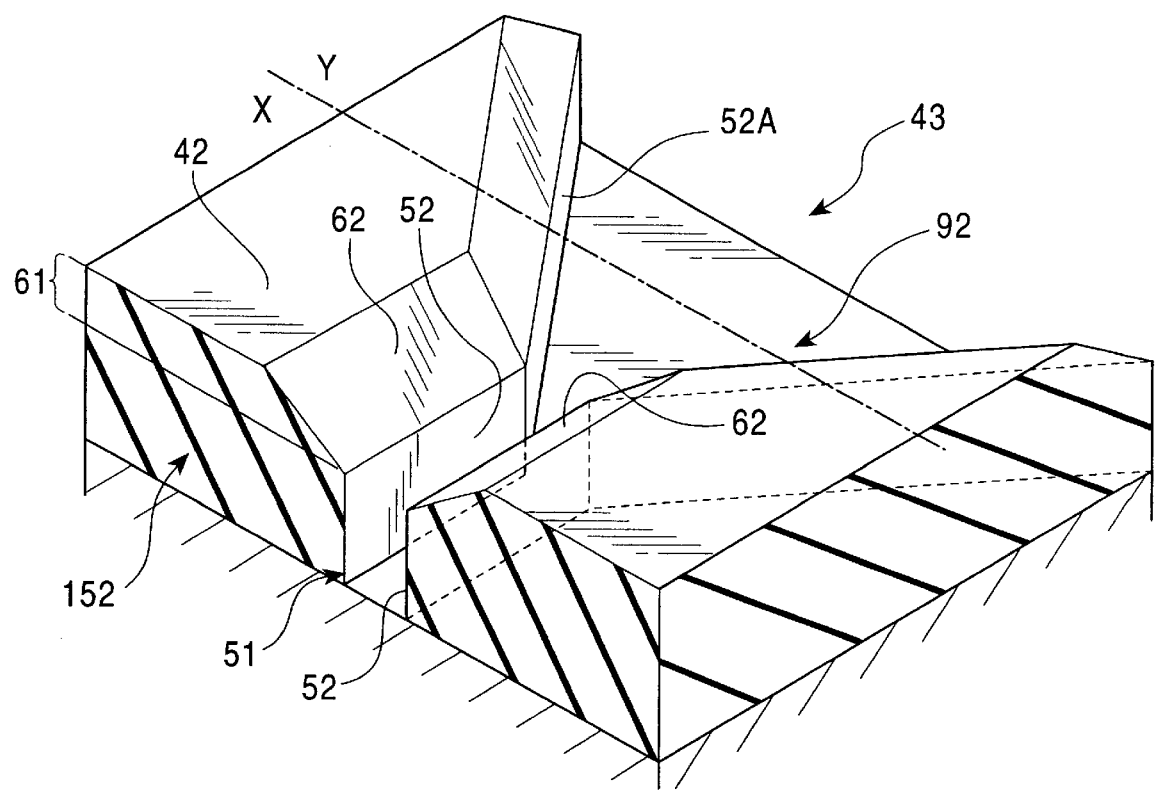
FIG. 28 is a perspective view of a groove of a thin-film magnetic head in accordance with a second embodiment of the present invention.

The groove 43 in the second embodiment includes the main portion 51 and an adjoining portion 92 extending from the main portion 51 to the back region Y on the lower core layer 27. In FIG. 28, the lower magnetic pole layer, the gap layer, and the upper magnetic pole layer are not depicted. The main portion 51 and the adjoining portion 92 have diverging sections 61 at the side of the upper core layer 47.

Figure 31:
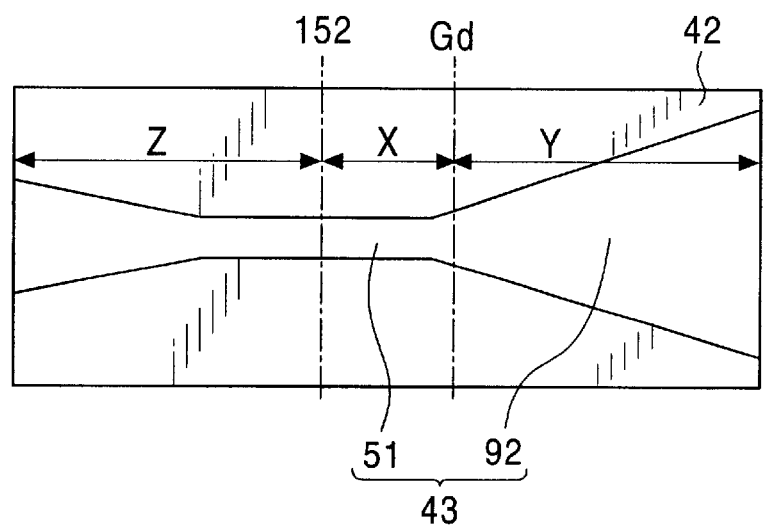
FIG. 31 is a front view for illustrating a method for making the thin-film magnetic head in accordance with the second embodiment.
Figure 32:
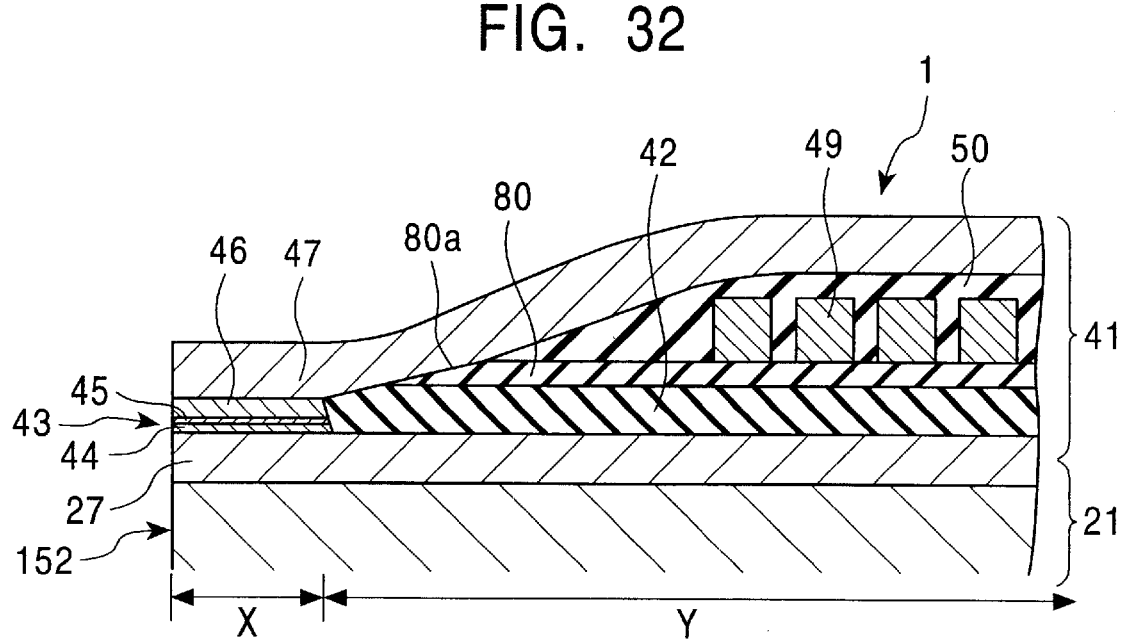
FIG. 32 is a side cross-sectional view of a thin-film magnetic head in accordance with a third embodiment of the present invention.

FIG. 31 shows a pattern of a mask layer to form the groove 43. This pattern is different from the pattern of the first embodiment shown in FIGS. 11 and 13 in that the adjoining portion 92 of the groove 43 is provided in the back region Y. That is, the adjoining portion 92 expands in the track width direction of the upper core layer 47 toward the back region Y.

The main portion 51 has two main side walls 52 which extend from the opposing face 152, are substantially parallel to each other, and are perpendicular to the lower core layer 27, and two outwardly expanding side walls 52A continuing from the back end of the main side walls 52.

The diverging section 61 has two outwardly sloping side-walls 62 which extend from the main side walls 52.

The lower magnetic pole layer 44 and the gap layer 45 are formed below the coil 49 in the main portion 51 and the adjoining portion 92, and the lower magnetic pole layer 44 connects to the lower core layer 27.

The upper magnetic pole layer 46 is formed in the main portion 51 and on the diverging section 61 in the magnetic pole end region X and connects to the upper core layer 47. The back end of the upper magnetic pole layer 46 defines the gap depth.

Figure 29:
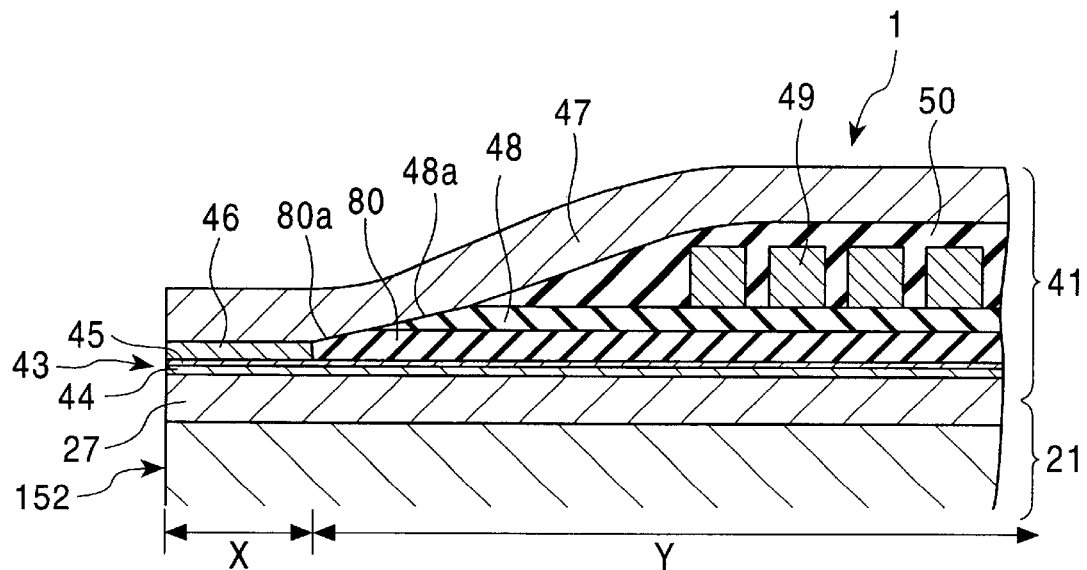
FIG. 29 is a side cross-sectional view of the thin-film magnetic head in accordance with the second embodiment.
Figure 30:
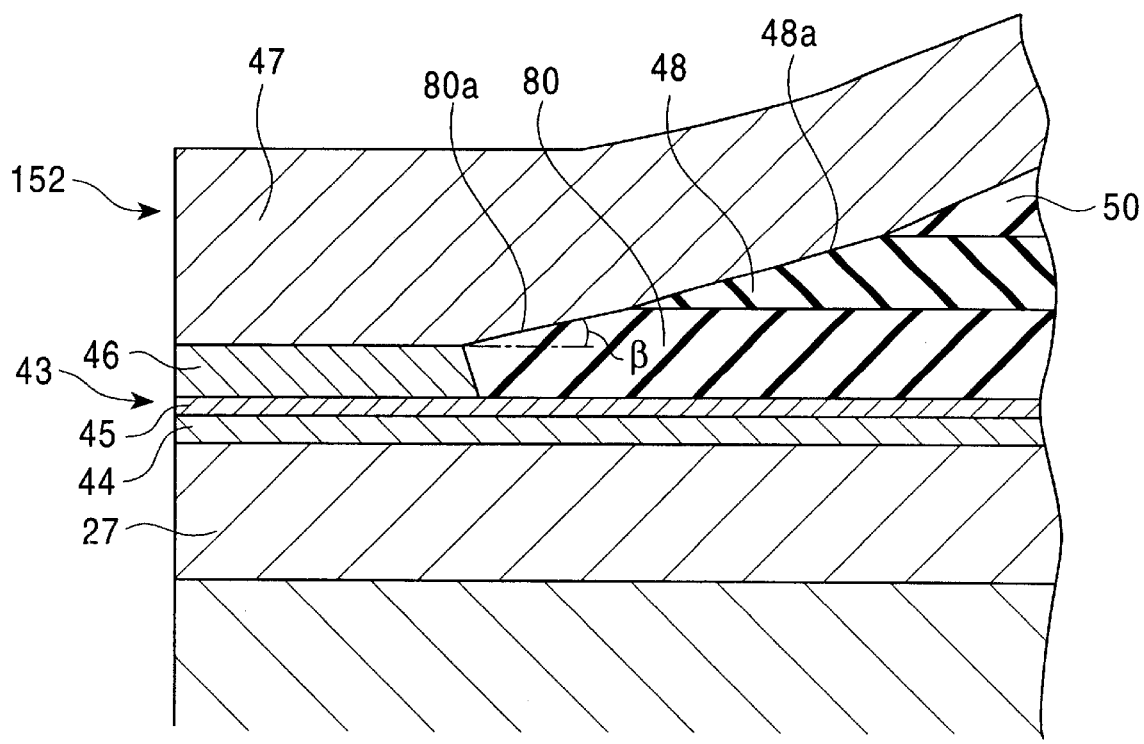
FIG. 30 is a side cross-sectional view of the main section of the thin-film magnetic head in accordance with the second embodiment.

With reference to FIGS. 29 and 30, the back insulating layer 80 and the coil insulating layer 48 are deposited on the gap layer 45 in the adjoining portion 92 in the back region Y. The back insulating layer 80 has the sloping face 80a so as to increase the thickness of the back insulating layer 80 toward the back region Y, and the coil insulating layer 48 has the sloping face 48a extending from the sloping face 80a.

The insulating layer 42, the lower magnetic pole layer 44, the gap layer 45, and the upper magnetic pole layer 46 are exposed at the opposing face 152.

In such a configuration, the magnetic recording track width at the opposing face 152 is equal to the width of the upper magnetic pole layer 46 at the opposing face 152. Thus, the magnetic recording track width can be decreased. Since the magnetic gap is exposed at the opposing face 152, magnetic recording can be effectively achieved by the fringing magnetic field from the magnetic gap.

The contact area between the upper magnetic pole layer 46 and the upper core layer 47 in the second embodiment is larger than that in the first embodiment, and the gap depth of the magnetic gap is defined by the distance from the opposing face 152 to the front end of the back insulating layer 80. Since the end of the upper magnetic pole layer 46 is not defined by a side face 53 which does not have a stable shape, the gap depth can be precisely determined.

With reference to FIG. 31, the groove 43 formed in this embodiment extends from an exterior region Z outside of the opposing face 152 to the back region Y so as to pass through the magnetic pole end region X. The upper face 27a of the lower core layer 27 is exposed on the bottom of the groove 43. The width of the groove 43 is generally 1 $\mu$m or less and preferably 0.5 $\mu$m or less in the main portion 51, and gradually increases in the adjoining portion 92 in the back region Y.

Since the lower magnetic pole layer 44, the gap layer 45, and the upper magnetic pole layer 46 are exposed at the opposing face 152 in the inductive thin-film write head 41, the magnetic gap width at the opposing face 152 is equal to the width of the upper magnetic pole layer 46. Thus, the magnetic gap width can be decreased. Moreover, the fringing magnetic field from the magnetic gap facilitates effective magnetic recording on a magnetic recording medium.

The magnetic gap depth is defined by the distance from the opposing face 152 to the back end of the upper magnetic pole layer 46, and the position of the back end can be determined by etching the upper mask layer 81 after the groove 43 is formed. Since the magnetic gap depth is not defined by the end face 53, of which the position or shape is not stable, of the groove 43, the magnetic gap depth is precisely determined.

In the inductive write head 41, the sloping face 80a and the sloping face 48a formed on the back insulating layer 80 and the coil insulating layer 48, respectively, smooth the magnetic flux and prevent leakage of the magnetic flux between the upper core layer 47 and the upper magnetic pole layer 46.

In the method for making the thin-film magnetic head, the second embodiment also has the same advantages as those of the first embodiment.

A third embodiment of the thin-film magnetic head and the method for making the same in accordance with the present invention will now be described with reference to the drawings.

FIGS. 32, 33, 34, 35A, and 35B are a side cross-sectional view, a perspective view, an enlarged side cross-sectional view, a front view, and an enlarged front view, respectively, of the thin-film magnetic head of the third embodiment. The same components as those in the first embodiment are referred to with the same reference numerals and detailed description thereof is omitted.

In the third embodiment, a groove 43 includes only a main portion 51 in a magnetic pole end region X. Thus, the thin-film magnetic head of this embodiment does not have an adjoining portion in the back region Y and a coil insulating layer.

Figure 33:
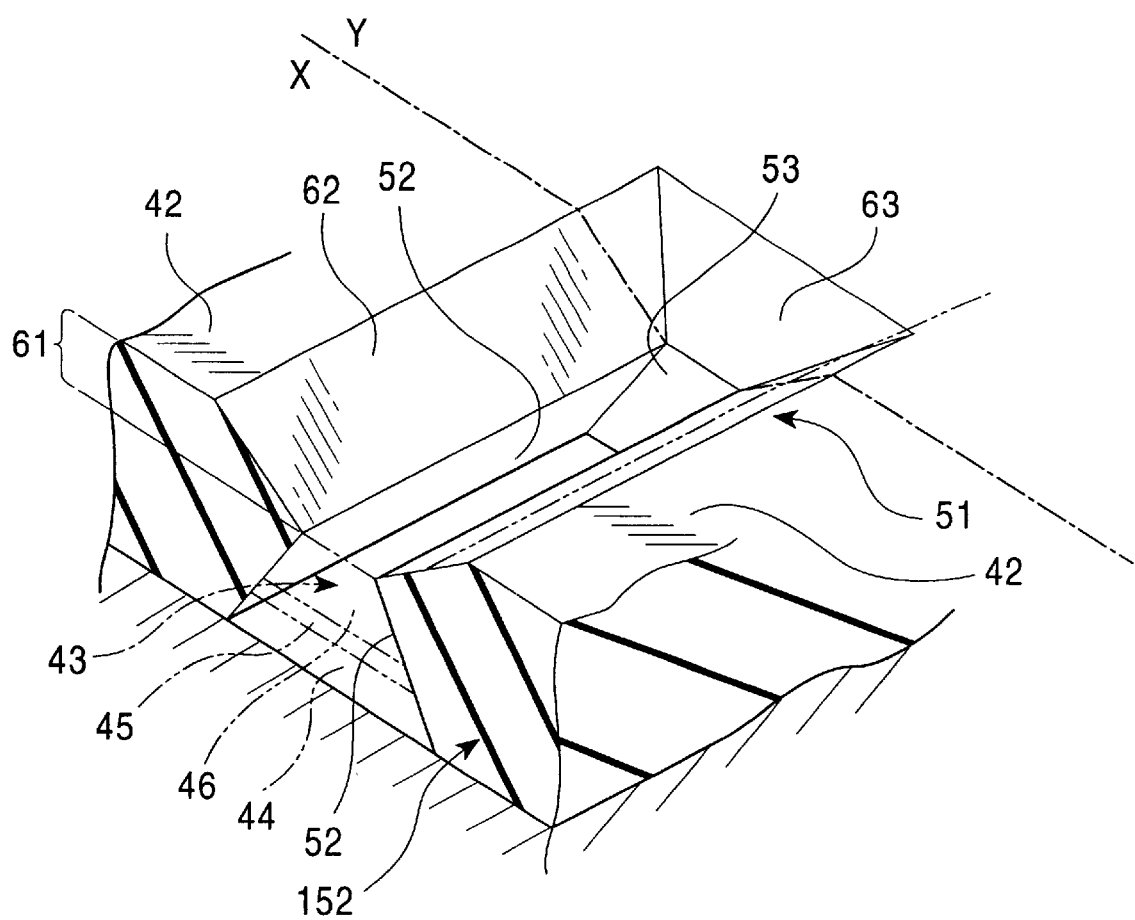
FIG. 33 is a perspective view of the main section, including a groove and a magnetic pole end region, of the thin-film magnetic head in accordance with the third embodiment.

The main portion 51 of the groove 43 has a uniform cross-section which is substantially the same as that at the opposing face 152 and lies in the magnetic pole end region X. As shown in FIG. 33, the main portion 51 has a diverging section 61 which will come into contact with the upper core layer 47.

The main portion 51 has two inwardly sloping side-walls 52 from the bottom, which is the upper face of the lower core layer 27. An end face 53 having a trapezoidal cross-section is thereby formed at the end of the main portion 51. The end face 53 is substantially parallel to the opposing face 152.

Figure 35A:
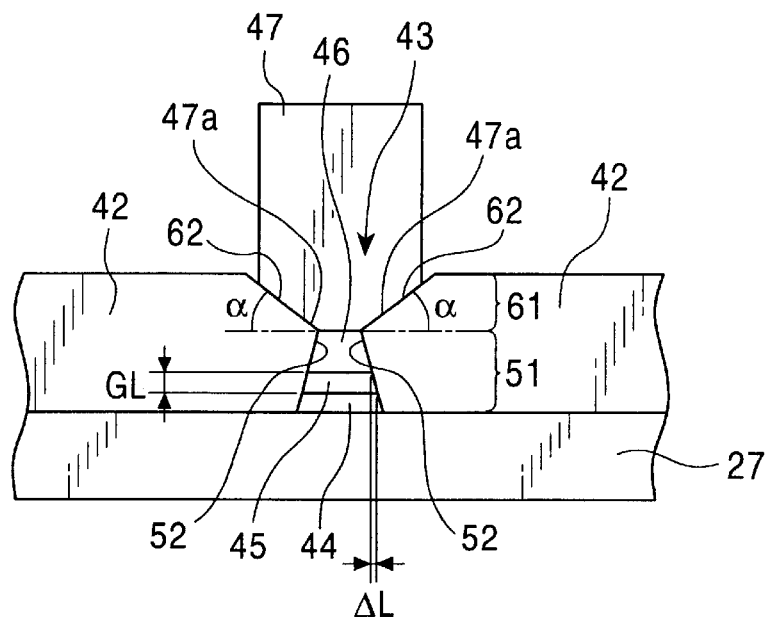
FIGS. 35A and 35B are a front view and an enlarged partial front view, respectively, of the main section of the magnetic pole end region of the thin-film magnetic head in accordance with the third embodiment.

The diverging section 61 has two outwardly sloping side-walls 62 above the main side walls 52 and an outwardly sloping end-wall 63 at the boundary to the back region Y. An upper core layer 47 is deposited in the diverging section 61 and thus has two tapered sections 47a corresponding to the diverging section 61, as shown in FIG. 35A.

In the main portion 51 of the groove 43, the lower magnetic pole layer 44 is deposited on the lower core layer 27 and the gap layer 45 is deposited on the lower magnetic pole layer. 44. Moreover, the upper magnetic pole layer 46 is deposited on the gap layer 45 in the main portion 51 and connects to the upper core layer 47. The back end of the upper magnetic pole layer 46, that is, the end face 53 of the main portion 51, defines the gap depth.

Figure 34:
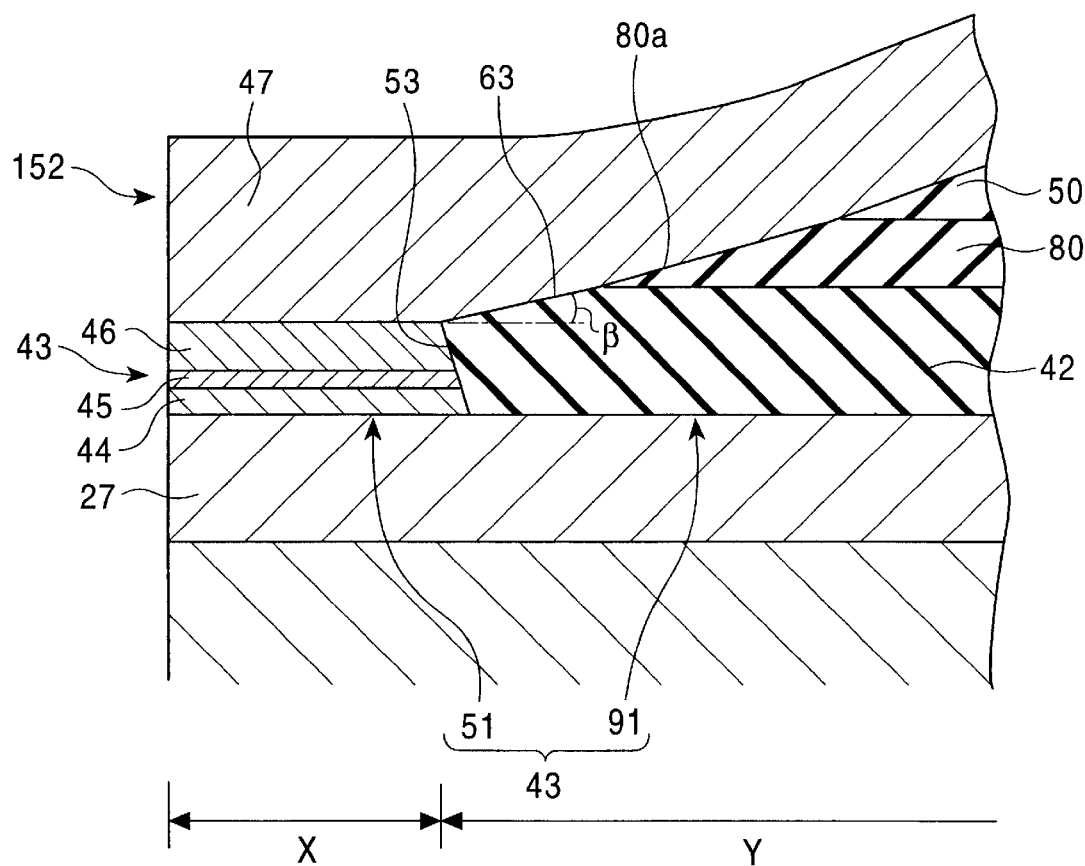
FIG. 34 is a side cross-sectional view of the main section of the magnetic pole end region of the thin-film magnetic head in accordance with the third embodiment.

With reference to FIG. 34, the back insulating layer 80 is formed on the insulating layer 42 in the back region Y, and has a sloping face 80a so as to increase the thickness thereof toward the back region Y. The sloping face 80a continues from the sloping end-wall 63. The tilt angle $\beta$ of the sloping end-wall 63 in FIG. 34 corresponds to the tilt angle $\beta$ of the sloping face 80a in FIG. 5.

The insulating layer 42, the lower magnetic pole layer 44, the gap layer 45, and the upper magnetic pole layer 46 are exposed at the opposing face 152.

Figure 35B:
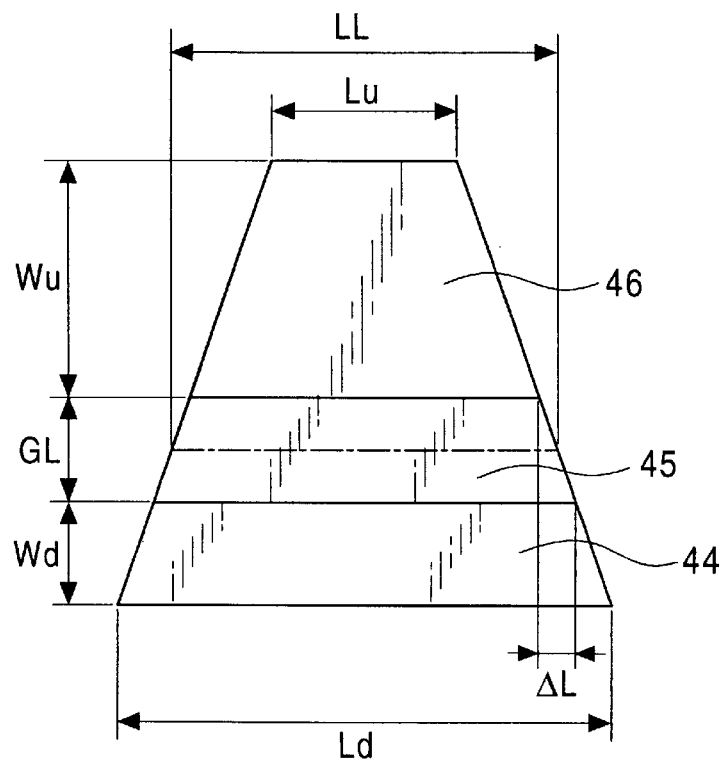

With reference to FIGS. 35A and 35B, the lower magnetic pole layer 44, the gap layer 45, and the upper magnetic pole layer 46 together has a trapezoidal cross-section at the opposing face 152 according to the cross-section of the main portion 61 of the groove 43. In the trapezoidal cross-section, the difference 2 $\Delta$L in width between the upper face of the lower magnetic pole layer 44 and the lower face of the upper magnetic pole layer 46 is set to be equal to or less than the thickness GL of the gap layer 45.

The gap depth, that is, the depth of the upper magnetic pole layer 46 from the slider 151 to the front end of the back region Y is set to be equal to or more than the width of the upper magnetic pole layer 46.

In such a configuration, the magnetic recording track width at the opposing face 152 is substantially equal to the width of the upper magnetic pole layer 46. Thus, the magnetic recording track width can be decreased by improving the precision of the width of the upper magnetic pole layer 46. Moreover, the magnetic gap is exposed at the opposing face 152. Thus, the fringing magnetic field from the magnetic gap facilitates effective magnetic recording on magnetic recording media.

In the inductive write head 41, the lower core layer 27 and the lower magnetic pole layer 44 form the lower core, and the upper core layer 47 and the upper magnetic pole layer 46 form the upper core. In addition, the lower magnetic pole layer 44, the gap layer 45, and the upper magnetic pole layer 46 form the magnetic gap. As a result, the magnetic gap is interposed between the upper core and the lower core.

Since the lower magnetic pole layer 44, the gap layer 45, and the upper magnetic pole layer 46 forming the magnetic gap has the above trapezoidal cross-section, the width of the upper magnetic pole layer 46 defines the magnetic recording track width. Thus, the magnetic recording track width can be decreased by decreasing the width of the upper magnetic pole layer 46.

For example, in FIG. 35B, the width Lu of the upper face of the upper magnetic pole layer 46 is 0.4 μm, the thickness Wu of the upper magnetic pole layer 46 is 0.2 μm, the mean width LL of the gap layer 45 is 0.6 μm, the thickness GL of the gap layer 45 is 0.2 μm, the width Ld of the lower face of the lower magnetic pole layer 44 is 0.8 μm, and the thickness Wd of the lower magnetic pole layer 44 is 0.2 μm. Such a combination of sizes can reduce the magnetic gap width to 1 μm or less.

In the inductive write head 41 of the present invention, the gap depth of the magnetic gap is defined by the distance from the opposing face 152 and the front end of the back insulating layer 80. Thus, the gap depth can be formed as designed.

In the inductive write head 41, as shown in FIGS. 33, 34, 35A, and 35B, the upper magnetic pole layer 46 is deposited in the main portion 51 of the groove 43, and the upper core layer 47 is deposited in the diverging section 61. Thus, the upper magnetic pole layer 46 and the upper core layer 47 are connected at the two tapered sections 47a. Thus, the magnetic flux between the upper core layer 47 and the upper magnetic pole layer 46 is smooth along the tapered sections 47a, and the magnetic flux does not leak to the periphery at the connections between the upper core layer 47 and the upper magnetic pole layer 46.

Moreover, as shown in FIG. 34, the sloping end-wall 63 of the diverging section 61 is formed and the back insulating layer 80 has the sloping face 80a. The sloping end-wall 63 connects with the sloping face 80a, and the tilt angle β of the sloping end-wall 63 corresponds to the tilt angle β of the sloping face 80a in FIG. 5. Thus, the magnetic flux at the interface between the upper core layer 47 and the upper magnetic pole layer 46 is also smooth and does not leak to the periphery of the interface.

With reference to FIG. 35A, the tilt angle of the outwardly sloping side-walls 62, that is, the tilt angle α of the tapered sections 47a is preferably in a range of 10 degrees to 80 degrees with respect to the upper face of the lower core layer 27.

With reference to FIG. 34, the tilt angle β of the sloping end-wall 63 of the back insulating layer 80 is preferably in a range of 10 degrees to 80 degrees with respect to the lower core layer 27, and the tilt angle of the sloping face 80a of the back insulating layer 80 is also preferably in a range of 10 degrees to 80 degrees.

At a tilt angle a of less than 10 degrees, reactance at the sides of the magnetic gap is small. Thus, a fringing magnetic field from the upper core layer 47 is generated in the upper magnetic pole layer 46 and is undesirably recorded onto a magnetic recording medium. A tilt angle α exceeding 80 degrees precludes alignment and development of a photoresist pattern when the upper core layer 47 is formed.

At a tilt angle β of less than 10 degrees or at a tilt angle of the sloping end-wall 63 of less than 10 degrees, reactance between the upper core layer 47 and the lower core layer 27 is small. Thus, a fringing magnetic field from the upper core layer 47 to the upper magnetic pole layer 46 increases, resulting in an undesirable decrease in recording efficiency. At an angle exceeding 80 degrees, the upper core layer 47 does not have a smooth cross-section. A steep upper core layer 47 causes a large antiferromagnetic field in the vicinity thereof. As a result, the edge of the upper core layer 47 exhibits large reactance which decreases the recording efficiency.

With reference to FIG. 34, the coil 49 is formed on the back insulating layer 80, and the upper insulating layer 50 covers the back insulating layer 80 and the coil 49. The coil 49 has a planar spiral pattern. The upper core layer 47 covers the upper magnetic pole layer 46, the sloping face 80a of the back insulating layer 80, and the upper insulating layer 50. Thus, the upper core layer 47 indirectly covers the coil 49 in the upper insulating layer 50.

The back insulating layer 80 improves insulation of the lower magnetic pole layer 44 and the lower core layer 27 with respect to the upper core layer 47 and the coil 49. Moreover, the tilt angle of the sloping face 80a can be controlled by changing the thickness of the back insulating layer 80. Thus, such a configuration enables a variety of designs.

The method for making the thin-film magnetic head in the second embodiment will now be described. As in the first embodiment, a part of the planarization insulating layer 26, the lower magnetic pole layer 44, the gap layer 45, and the upper magnetic pole layer 46 are formed in that order (refer to FIGS. 9 and 10). The lower magnetic pole layer 44, the gap layer 45, and the upper magnetic pole layer 46 are formed by a sputtering process, a physical vapor deposition (PVD) process, or an ion beam deposition (IBD) process.

Figure 36:
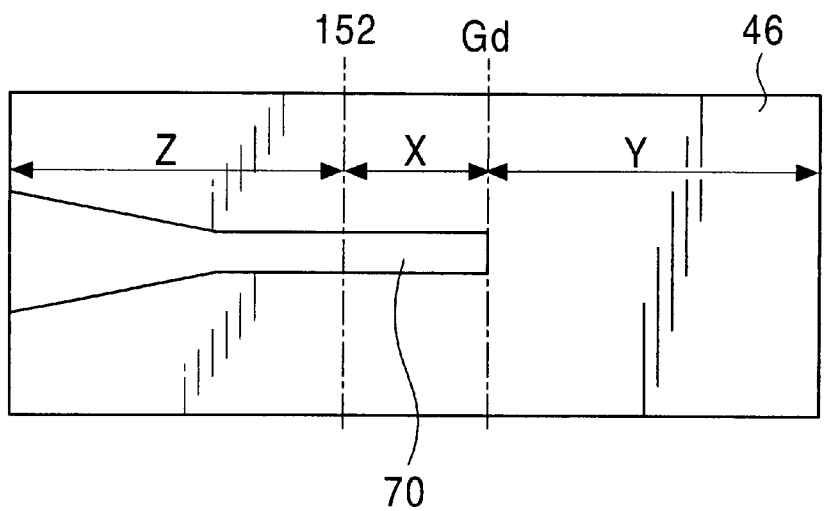
FIG. 36 is a plan view for illustrating a method for making the thin-film magnetic head in accordance with the third embodiment.
Figure 37:
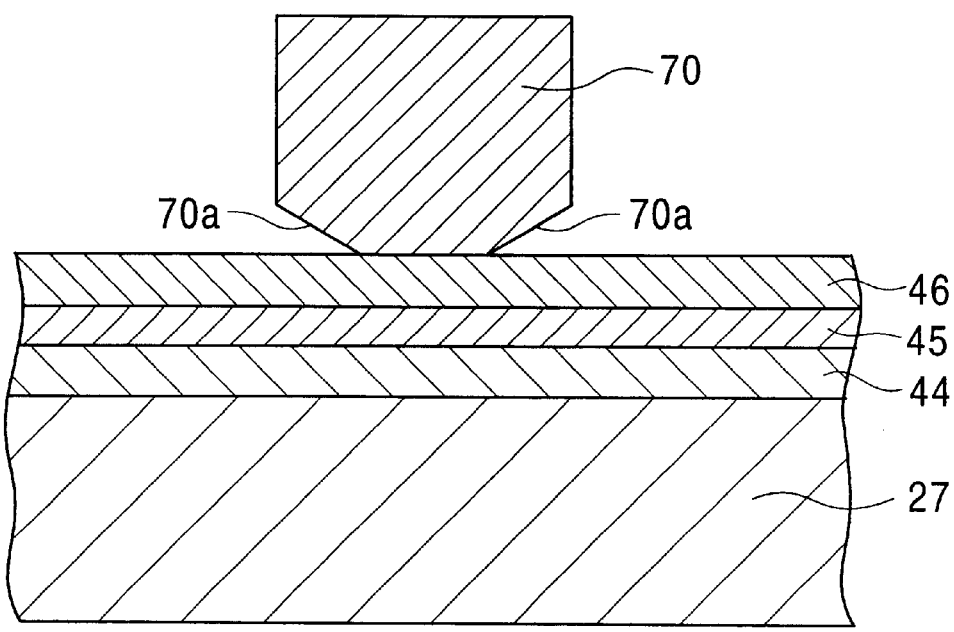
FIG. 37 is a front cross-sectional view for illustrating a method for making the thin-film magnetic head in accordance with the third embodiment.
Figure 38:
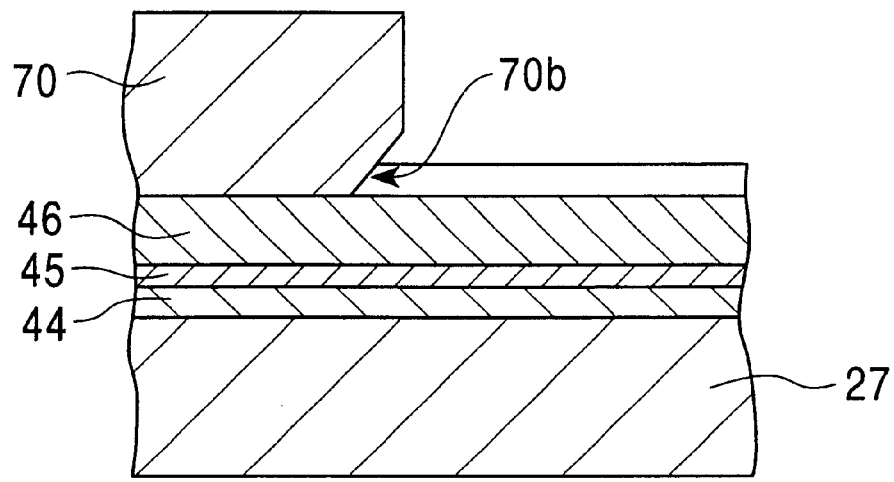
FIG. 38 is a side cross-sectional view for illustrating. a method for making the thin-film magnetic head in accordance with the third embodiment.

With reference to FIG. 36, the mask layer 70 is formed on the opposing face 152 so as to extend from the exterior of the opposing face 152 to the end of the magnetic pole end region X. With reference to FIG. 37, the mask layer 70 has two notches 70a at both bottom sides. With reference to FIG. 38, the mask layer 70 has a notch 70b at the end face 53 of the groove 43. These notches 70a and 70b are formed by the subsequent anisotropic etching step.

The mask layer 70 has a thickness of 0.6 μm to 5.0 μm. Moreover, the width of the mask layer 70 at the opposing face 152 is set to be 1 μm or less to be substantially the same as the magnetic gap width.

Preferably, the mask layer 70 is a photoresist layer. The photoresist layer may be a novolak-resin positive photoresist, a rubber-based negative photoresist, or a photoresist sensitive to far ultraviolet rays, electron beams, X-rays, or ion beams.

Figure 39:
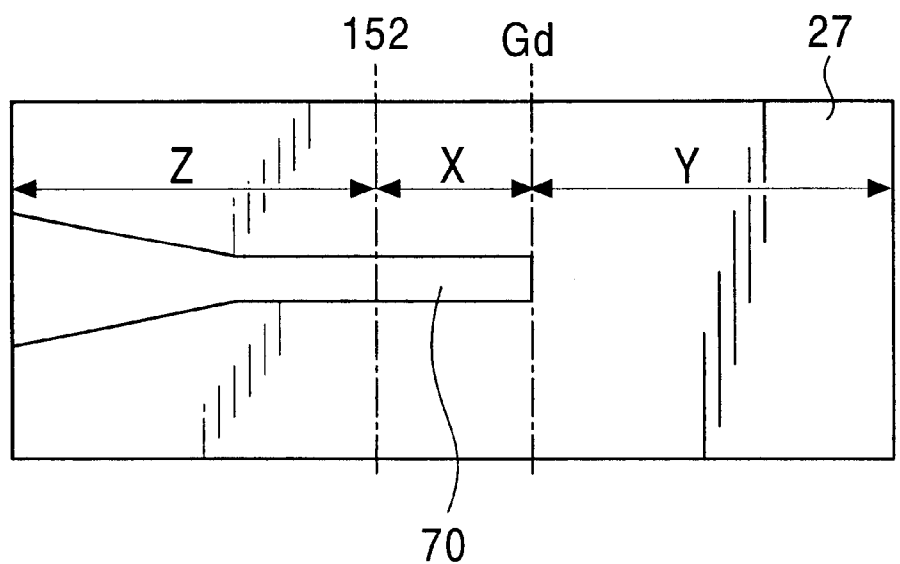
FIG. 39 is a plan view for illustrating a method for making the thin-film magnetic head in accordance with the third embodiment.
Figure 40:
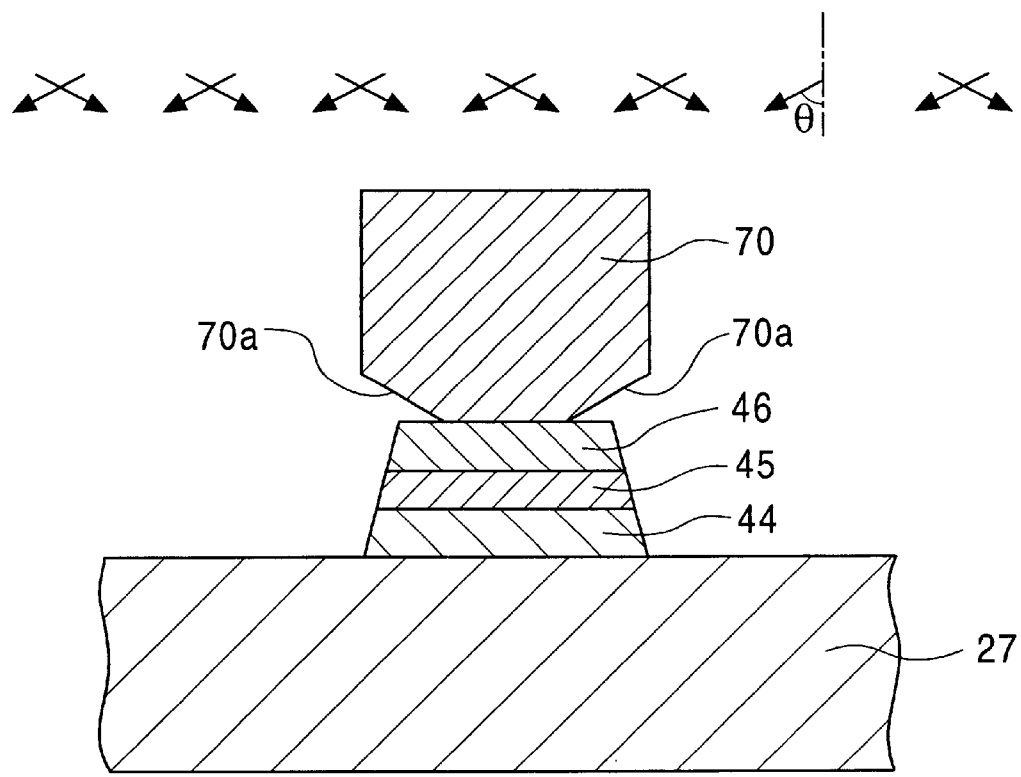
FIG. 40 is a front cross-sectional view for illustrating a method for making the thin-film magnetic head in accordance with the third embodiment.

With reference to FIGS. 39 and 40, the lower magnetic pole layer 44, the gap layer 45, and the upper magnetic pole layer 46 are subjected to anisotropic etching to expose the lower core layer 27. A preferable anisotropic etching process is a physical ion beam etching (ion milling) process. In the etching process, the irradiation angle θ of the ion beams with respect to the vertical line in the drawing is preferably in a range of $0° \theta \leq 4°$.

When the upper magnetic pole layer 46, the upper core layer 47, and the upper magnetic pole layer 46 are shaped by anisotropic etching, the accuracy of the width to the thickness can be improved without the occurrence of side etching.

The ion milling process using Ar ions can etch a variety of materials and thus can simultaneously etch the lower magnetic pole layer 44, the gap layer 45, and the upper magnetic pole layer 46, which are composed of different materials. Since the ion milling process has high anisotropy, an exact angle can be set.

As shown in FIG. 40, by the notches 70a of the mask layer 70, the lower magnetic pole layer 44, the gap layer 45, and the upper magnetic pole layer 46 are etched to have a magnetic gap width. As a result, as shown in FIG. 35B, the difference 2ΔL between the length Lu of the upper face of the lower magnetic pole layer 44 and the length Ld of the lower face of the upper magnetic pole layer 46 can be set to be equal to or less than the thickness GL of the gap layer 45.

Figure 41:
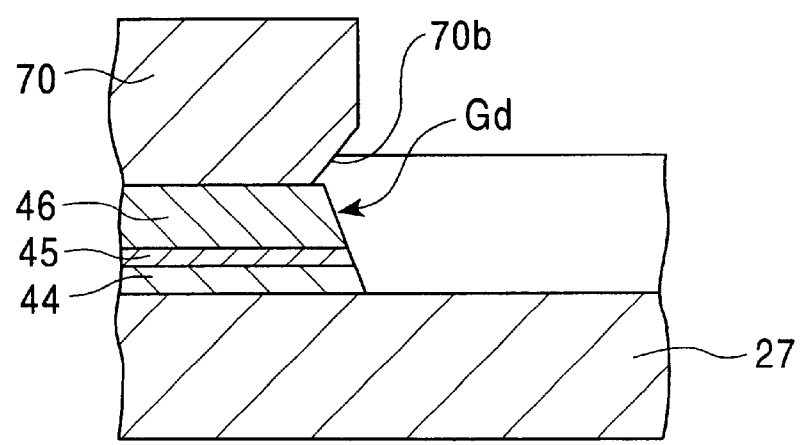
FIG. 41 is a side cross-sectional view for illustrating a method for making the thin-film magnetic head in accordance with the third embodiment.

As shown in FIG. 41, the mask layer 70 has the notch 70b at the bottom. Thus, the lower magnetic pole layer 44, the gap layer 45, and the upper magnetic pole layer 46 are substantially perpendicularly etched to form the gap depth Gd at the boundary between the magnetic pole end region X and the back region Y. The formed gap depth Gd is substantially parallel to the opposing face 152.

Figure 42:
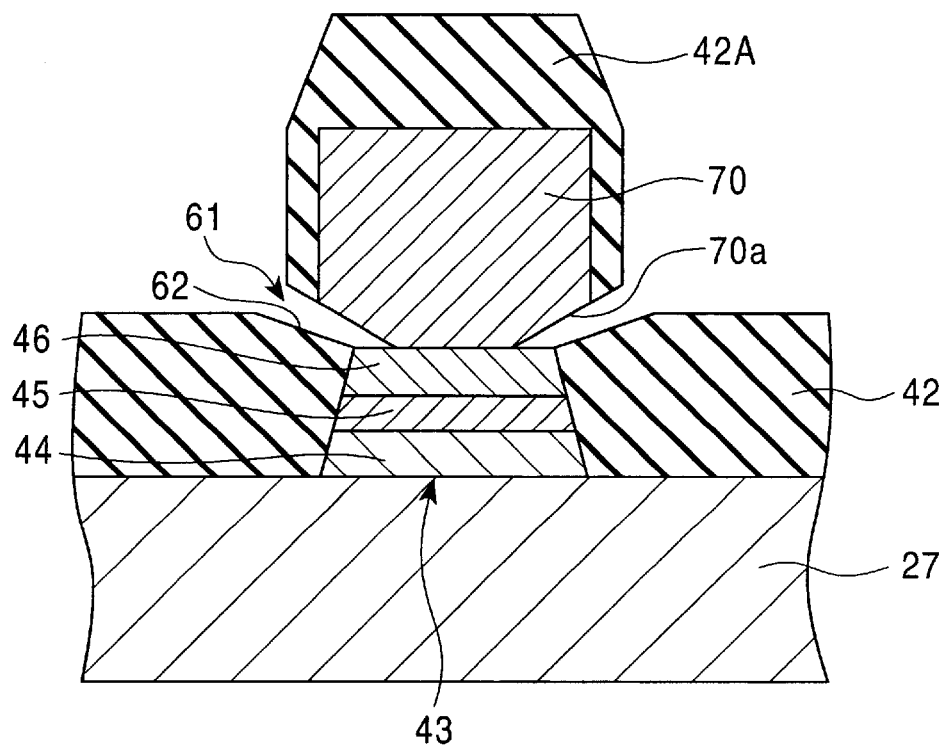
FIG. 42 is a front cross-sectional view for illustrating a method for making the thin-film magnetic head in accordance with the third embodiment.
Figure 43:
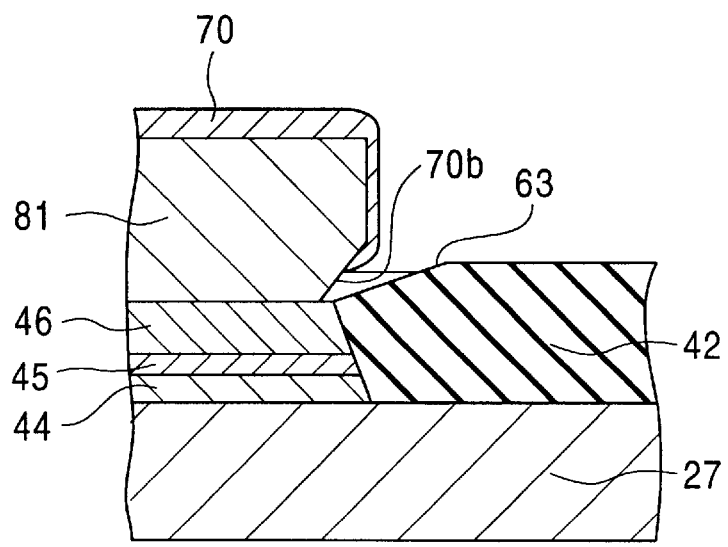
FIG. 43 is a side cross-sectional view for illustrating a method for making the thin-film magnetic head in accordance with the third embodiment.

With reference to FIG. 42, the insulating layer 42 is formed without removing the mask layer 70 on the upper magnetic pole layer 46, preferably, by an anisotropic sputtering process, an ion beam sputtering process, an ion beam deposition process, a long slow sputtering process, or a collimated sputtering process. A deposited layer 42A is formed on the mask layer 70 and the outwardly sloping side-walls 62 are formed on the insulating layer 42 at the boundaries to the upper magnetic pole layer 46, due to the notches 70a. Moreover, the sloping end-wall 63 is formed at the boundary between the magnetic pole end region X and the back region Y due to the notch 70b.

The mask layer 70 with the deposited layer 42A is removed using acetone or N-methyl-2-pyrrolidone (NMP).

Figure 44:
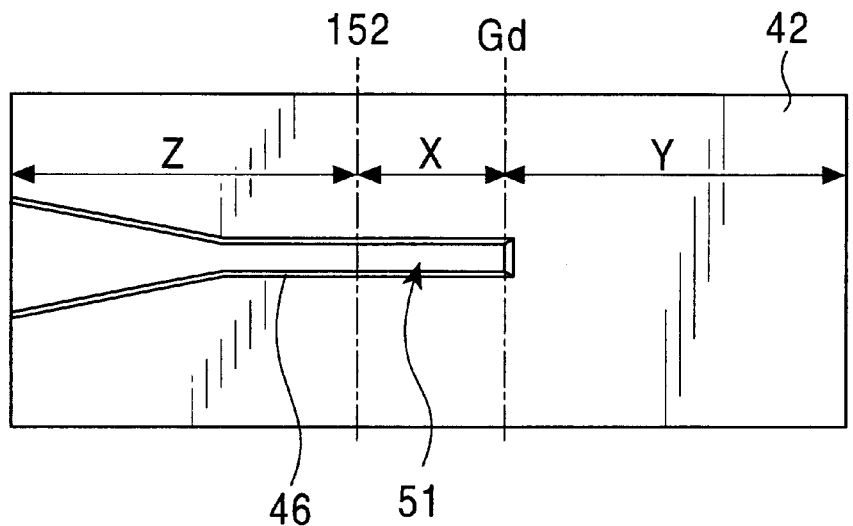
FIG. 44 is a plan view for illustrating a method for making the thin-film magnetic head in accordance with the third embodiment.
Figure 45:
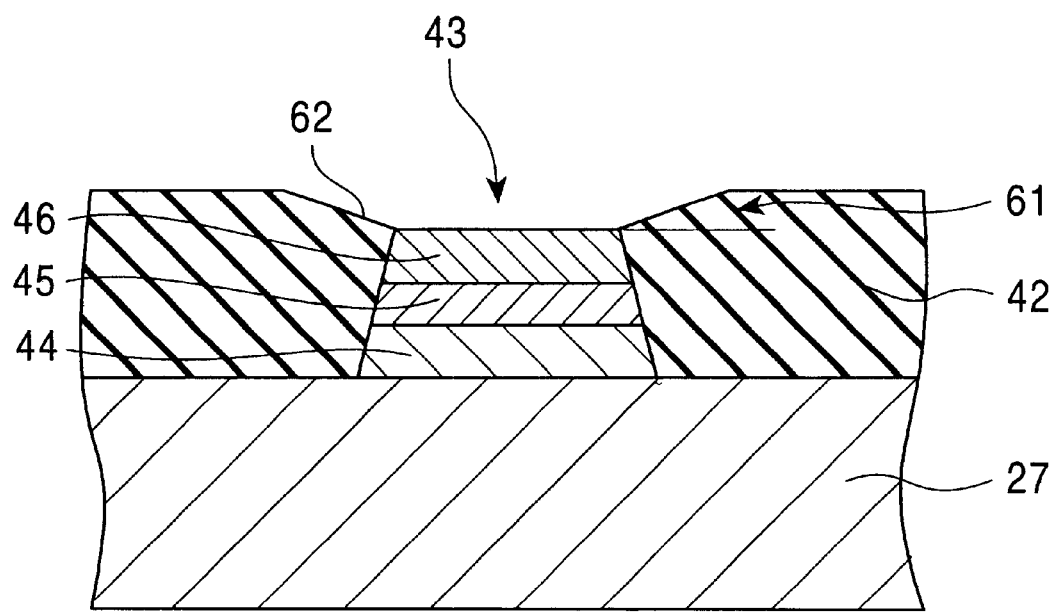
FIG. 45 is a front cross-sectional view for illustrating a method for making the thin-film magnetic head in accordance with the third embodiment.
Figure 46:
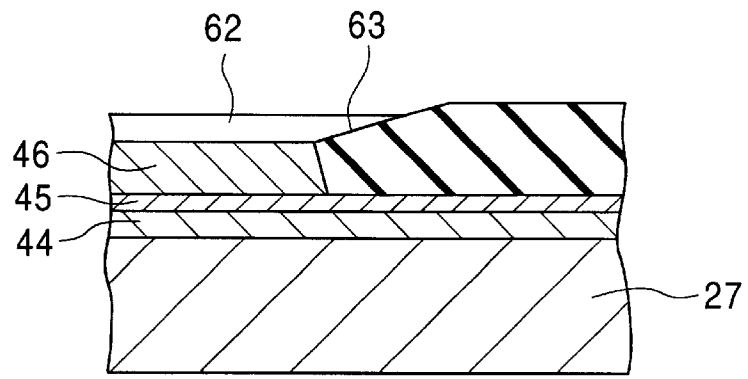
FIG. 46 is a side cross-sectional view for illustrating a method for making the thin-film magnetic head in accordance with the third embodiment.

With reference to FIGS. 44 to 46, the groove 43 having only the main portion 51 is formed in the insulating layer 42. Moreover, the diverging section 61 having the outwardly sloping side-walls 62 and the sloping end-wall 63 is formed on the insulating layer 42.

Figure 47:
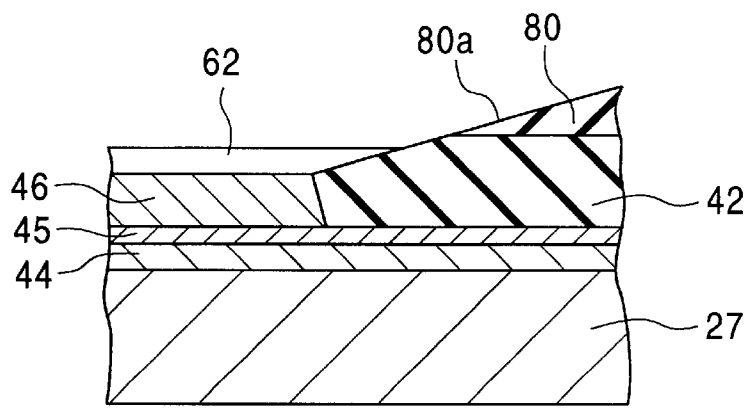
FIG. 47 is a side cross-sectional view for illustrating a method for making the thin-film magnetic head in accordance with the third embodiment.

With reference to FIG. 47, the back insulating layer 80 is formed on the insulating layer 42 in the magnetic pole end region X. The back insulating layer 80 has the sloping face 80a which extends from the sloping end-wall 63. The tilt angle of the sloping face 80a is determined by the tilt angle of the sloping end-wall 63.

Figure 48:
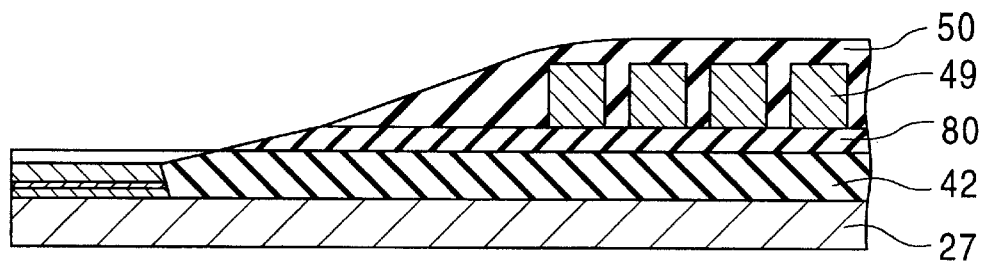
FIG. 48 is a side cross-sectional view for illustrating a method for making the thin-film magnetic head in accordance with the third embodiment.

With reference to FIG. 48, the coil 49 is formed on the back insulating layer 80 and the upper insulating layer 50 is deposited to embed the coil 49.

Figure 49:
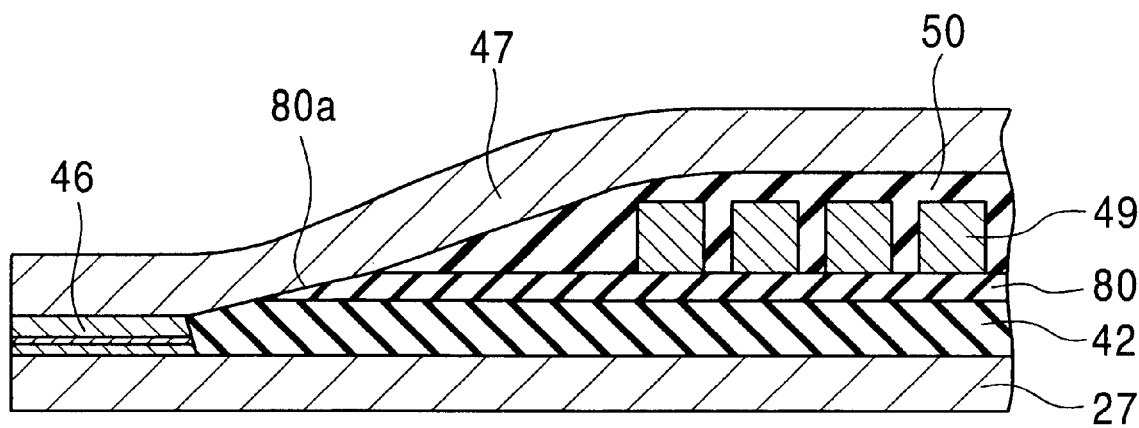
FIG. 49 is a side cross-sectional view for illustrating a method for making the thin-film magnetic head in accordance with the third embodiment.
Figure 50:
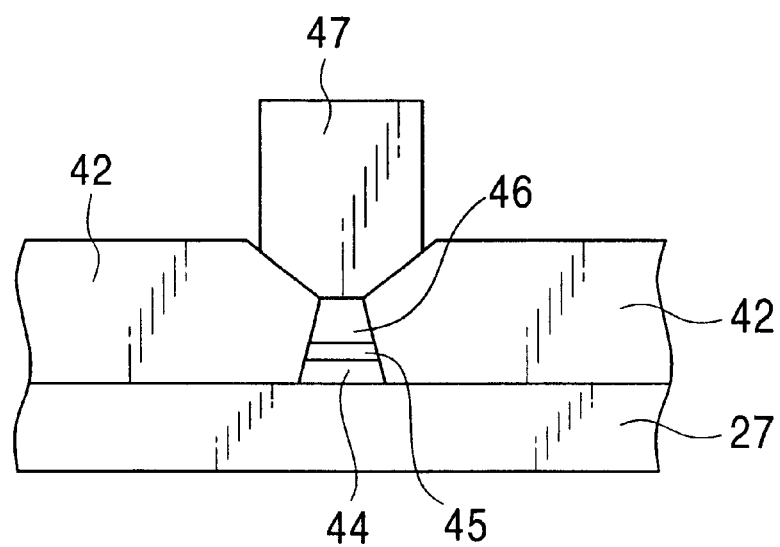
FIG. 50 is a front cross-sectional view for illustrating a method for making the thin-film magnetic head in accordance with the third embodiment.
Figure 51:
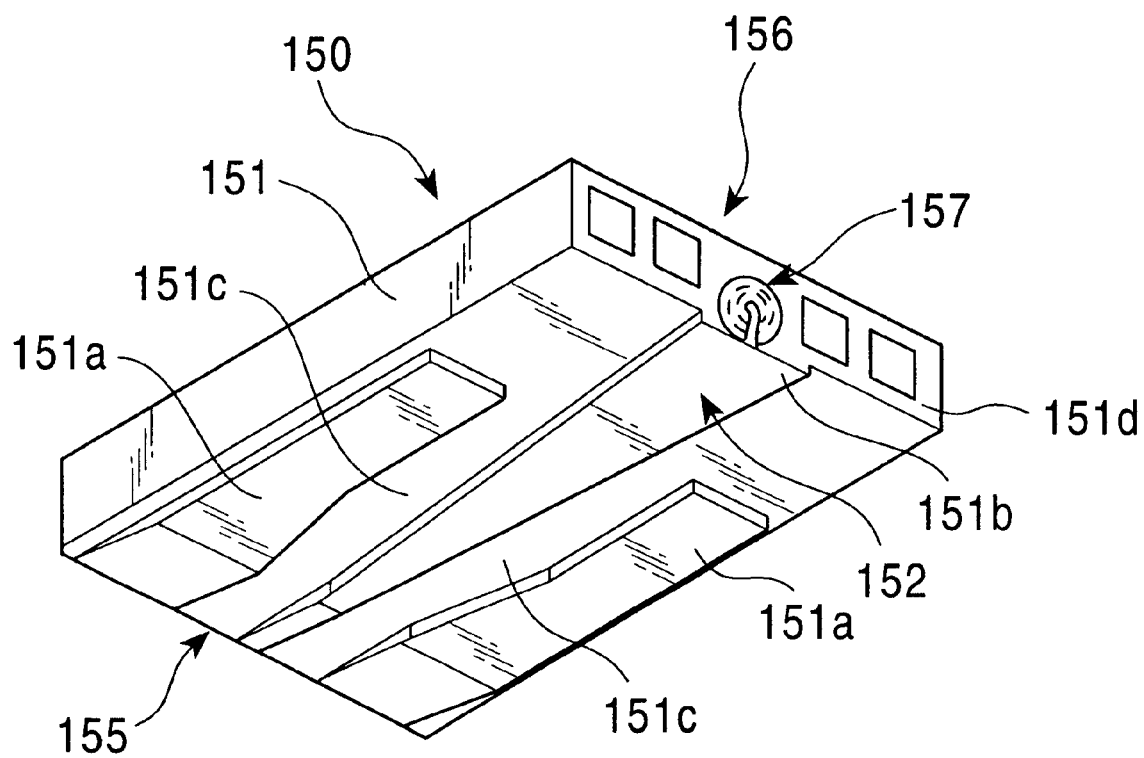
FIG. 51 is a perspective view of a conventional floating magnetic head.
Figure 52:
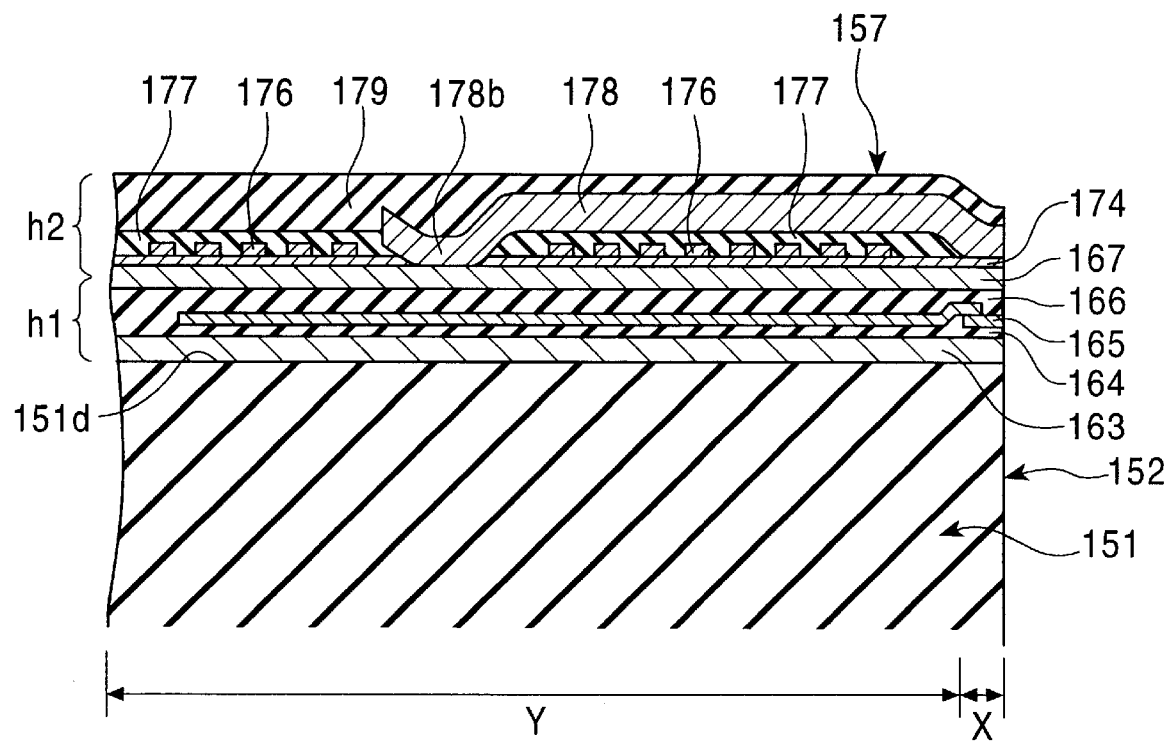
FIG. 52 is a side cross-sectional view of a conventional combined thin-film magnetic head.
Figure 53:
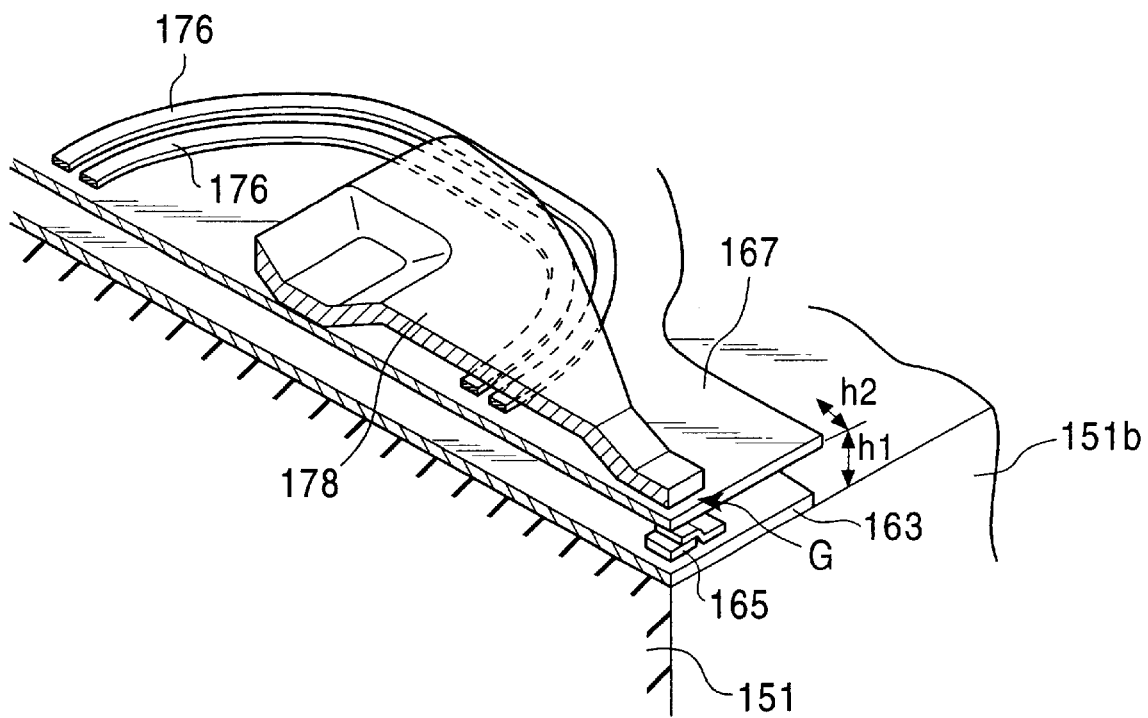
FIG. 53 is a perspective view of the conventional combined thin-film magnetic head.
Figure 54:
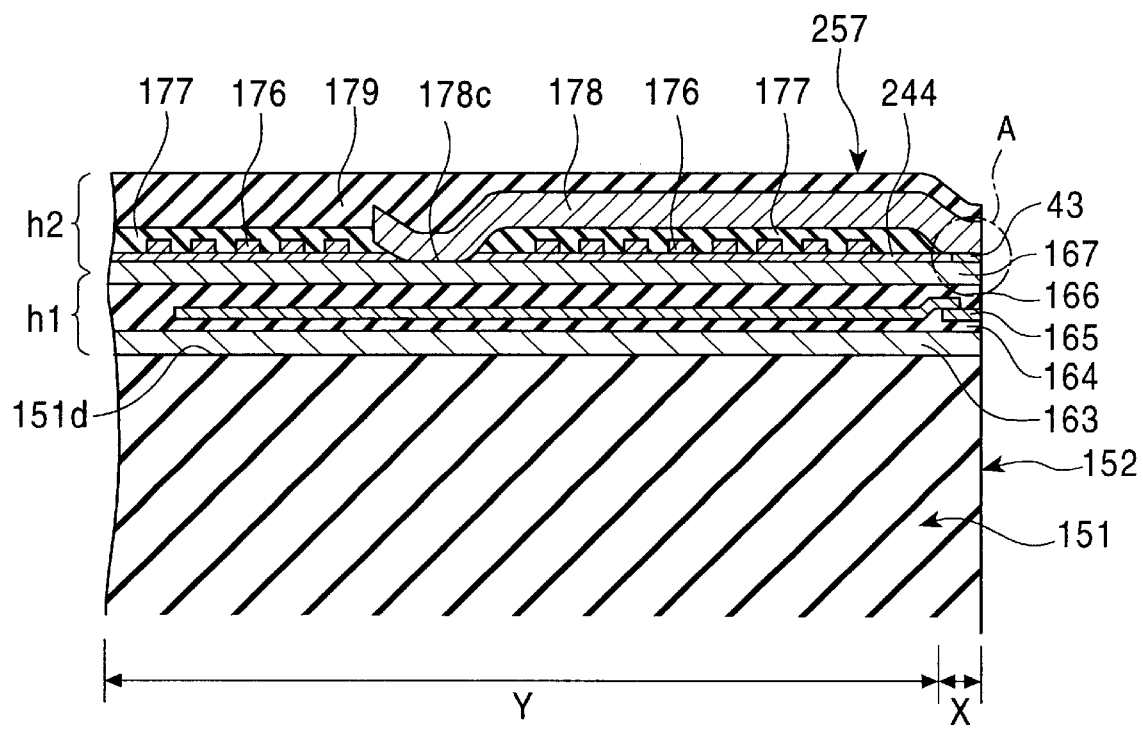
FIG. 54 is a side cross-sectional view of a conventional combined thin-film magnetic head.
Figure 55:
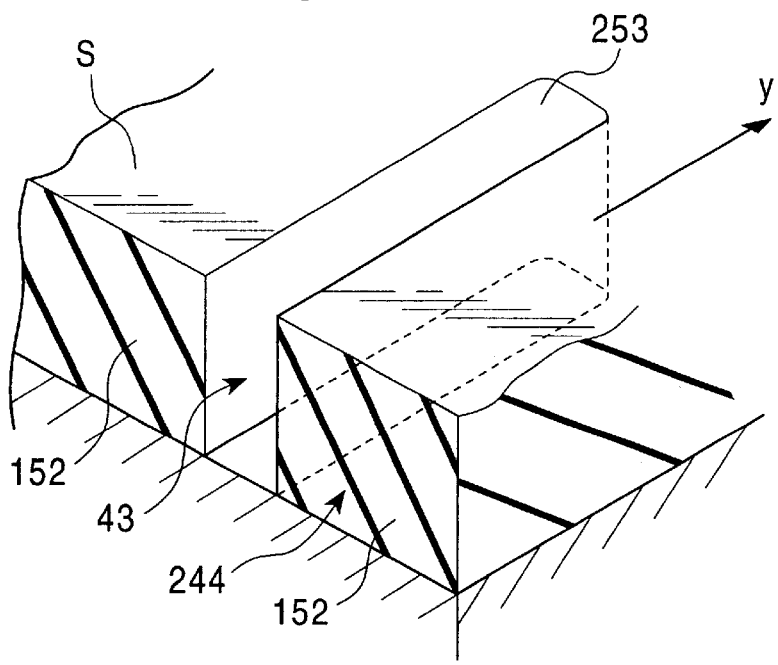
FIG. 55 is an expanded perspective view of the main section of a magnetic pole end region in a production step of a conventional thin-film magnetic head.
Figure 56:
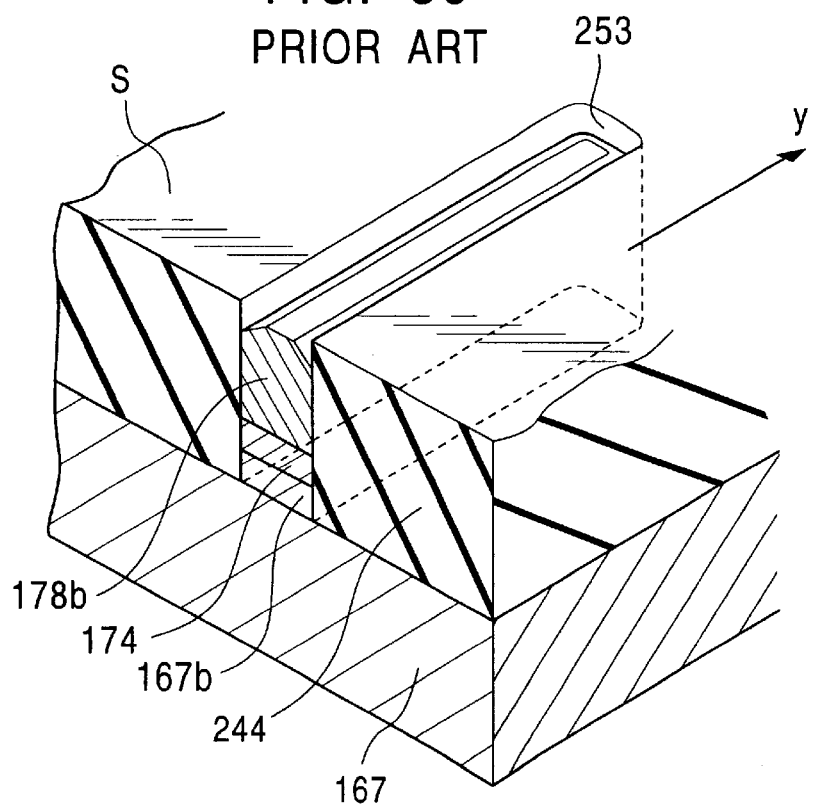
FIG. 56 is an expanded perspective view of the main section of a magnetic pole end region in a production step of the conventional thin-film magnetic head.
Figure 57:
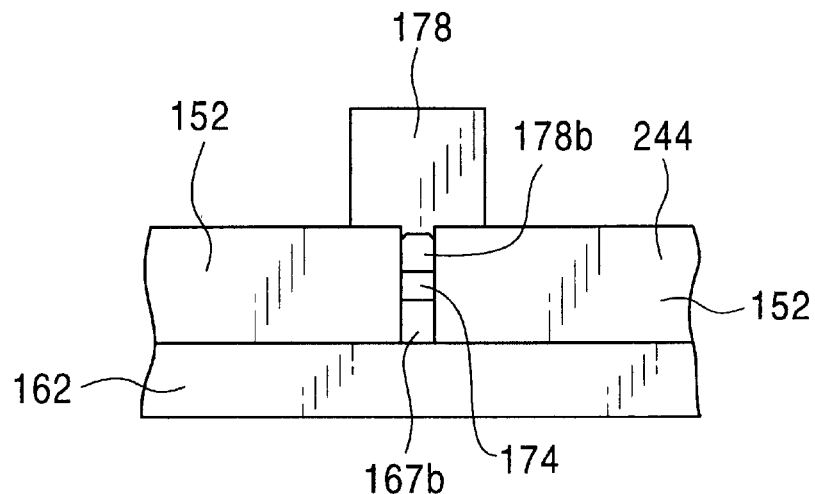
FIG. 57 is a front cross-sectional view of a conventional combined thin-film magnetic head.
Figure 58:
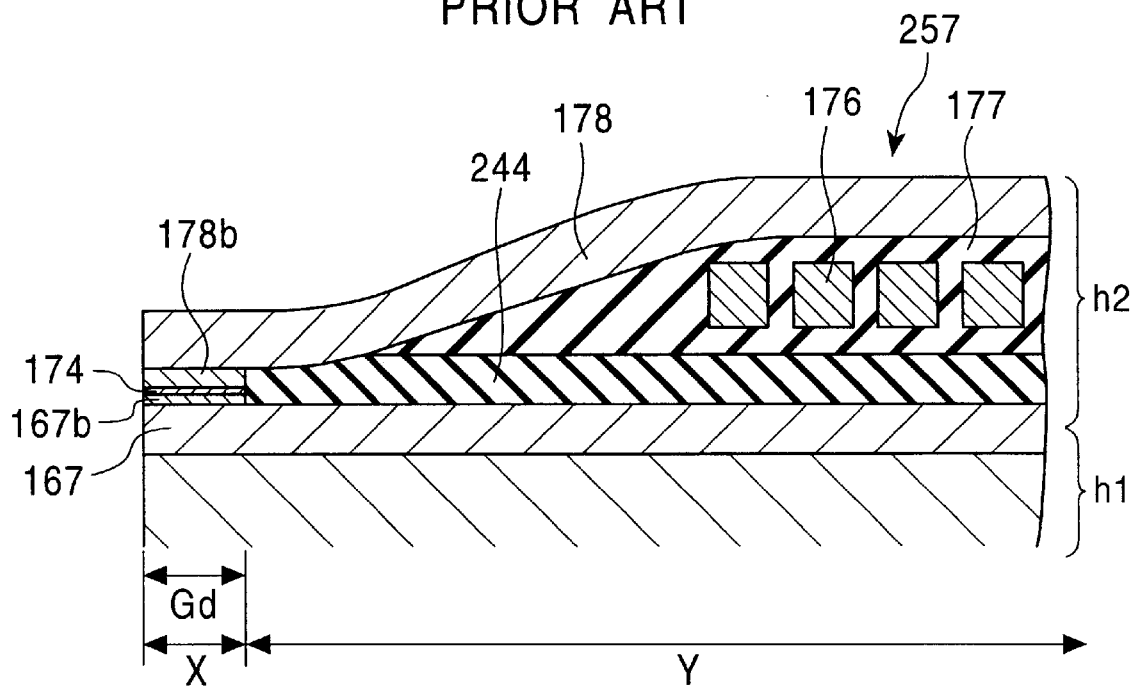
FIG. 58 is a side cross-sectional view of the conventional combined thin-film magnetic head.

With reference to FIG. 49, the upper core layer 47 is formed over the upper magnetic pole layer 46, the sloping face 80a of the back insulating layer 80, the sloping end-wall 63 of the insulating layer 42, and the upper insulating layer 50 so as to entirely cover the upper magnetic pole layer 46, as shown in FIG. 50.

The product is cut at the opposing face 152 and the opposing face 152 is polished to form the thin-film magnetic write head 41 of this embodiment.

The inductive write head 41 has the same advantages as those in the first and second embodiments. Since the lower magnetic pole layer 44, the gap layer 45, and the upper magnetic pole layer 46 are exposed at the opposing face 152, the magnetic gap width at the opposing face 152 is equal to the width of the upper magnetic pole layer 46. Thus, the magnetic gap width can be decreased, and magnetic recording on a magnetic recording medium by a fringing magnetic field from the magnetic gap is effective.

In addition, in this embodiment, the magnetic gap depth is defined by the distance from the opposing face 152 to the end of the upper magnetic pole layer 46, that is, the end face 53 of the groove 43.

In the anisotropic etching process for the lower magnetic pole layer 44, the gap layer 45, and the upper magnetic pole layer 46, the gap depth Gd is also determined. Thus, another step for etching the upper magnetic pole layer 46 is not necessary. Accordingly, this embodiment improves process efficiency and reduces production costs of the thin-film magnetic heads.

What is claimed is:

1. A thin-film magnetic head comprising:
   an upper core layer and a lower core layer extending from a back region to a magnetic pole end region, the upper core layer and the lower core layer being exposed at an opposing face opposing a medium and being connected to each other in the back region;
   a coil provided on the periphery of the connection of the upper core layer and the lower core layer;
   a gap layer provided between the upper core layer and the lower core layer in the magnetic pole end region;
   an insulating layer formed on the lower core layer; and
   a groove formed in the magnetic pole end region of the insulating layer and extending from the opposing face to the back region;
   wherein the groove forms an opening in the lower core layer, the upper core layer, and the opposing face, and has a main portion having a cross-sectional size which is substantially the same as the size of the opening at the opposing face;
   a lower magnetic layer, the gap layer, and a upper magnetic layer are deposited in the groove;
   the lower magnetic pole layer is in contact with the lower core layer and the upper magnetic pole layer is in contact with the upper core layer such that the upper magnetic pole layer constitutes an upper magnetic pole end and the lower magnetic pole layer constitutes a lower magnetic pole end;
   in the exposed section at the opposing face, a length of the lower magnetic pole layer in a track width direction is larger than a length of the upper magnetic pole layer in the track width direction, and
   wherein, at the opposing face, the difference between the length of the lower magnetic pole layer in the track width direction and the length in the track width direction of the upper magnetic pole layer in. contact with the gap layer is not greater than a thickness of the gap layer.

2. A thin-film magnetic head according to claim 1, wherein a back insulating layer is deposited in the back region of the gap layer.

3. A thin-film magnetic head according to claim 2, wherein the back insulating layer has a sloping face such that a thickness of the back insulating layer increases toward the back region.

4. A thin-film magnetic head according to claim 1, wherein an adjoining portion extending to the back region has a cross-sectional size which is substantially the same as that of the main portion.

5. A thin-film magnetic head according to claim 1, wherein the length of the upper magnetic pole layer from the opposing face is not less than a width of the upper magnetic pole layer.

6. A thin-film magnetic head according to claim 1, wherein the gap layer comprises metal.

7. A thin-film magnetic head according to claim 1, wherein each of the upper magnetic pole layer and the lower magnetic pole layer comprises one alloy selected from the group consisting of a Ni—Fe alloy; a Ni—Fe—Nb alloy; a Co—Fe alloy; a Co—Fe—Ni alloy; a Co—Fe—Ni—X alloy wherein X is at least one element selected from the group consisting of Mo, Cr, Pd, B, and In; a Co—Zr—Nb alloy; a Co—Hf—Nb alloy; an Fe—M—C alloy wherein M is at least one element selected from the group consisting of Hf, Zr, Ti, V, Nb, Ta, Cr, Mo, and W; a T—X—M—Z—Q alloy wherein T is at least one element of Fe and Co, X is at least one element of Si and Al, M is at least one element selected from the group consisting of Ti, Zr, Hf, V, Ta, Mo, and W, Z is at least one element of C and N, and Q is at least one element selected from the group consisting of Cr, Re, Rh, Ni, Pd, Pt, and Au; a T—Si—Al—M—Z—Q alloy wherein T is at least one element of Fe and Co, M is at least one element of Zr, Hf, Nb, and Ta, Z is at least one element of C and N, and Q is at least one element selected from the group consisting of Cr, Ti, Mo, W, V, Re, Ru, Ni, Pd, Pt, and Au; and an Fe—M—O alloy wherein M is at least one element selected from the group consisting of Hf, Zr, Ti, V, Nb, Ta, Cr, Mo, and W.

8. A thin-film magnetic head according to claim 1, wherein a width of the main portion of the groove is not greater than 1 µm.

9. A combined thin-film magnetic head comprising:
a magnetic read head having a magnetoresistive element, and
a thin-film magnetic head according to claim 1.

10. A thin-film magnetic head according to claim 1, wherein a cross-sectional size of an adjoining portion extending to the back region gradually increases in a track width direction of the lower core layer.

11. A thin-film magnetic head comprising:
an upper core layer and a lower core layer extending from a back region to a magnetic pole end region, the upper core layer and the lower core layer being exposed at an opposing face opposing a medium and being connected to each other in the back region;
a coil provided on the periphery of the connection of the upper core layer and the lower core layer;
a gap layer provided between the upper core layer and the lower core layer in the magnetic pole end region;
an insulating layer formed on the lower core layer; and
a groove formed in the magnetic pole end region of the insulating layer and extending from the opposing face to the back region;
wherein the groove forms an opening in the lower core layer, the upper core layer, and the opposing face, and has a main portion having a cross-sectional size which is substantially the same as the size of the opening at the opposing face;
the a lower magnetic layer, the gap layer, and the a upper magnetic layer are deposited in the groove;
the lower magnetic pole layer is in contact with the lower core layer and the upper magnetic pole layer is in contact with the upper core layer such that the upper magnetic pole layer constitutes an upper magnetic pole end and the lower magnetic pole layer constitutes a lower magnetic pole end; and
in the exposed section at the opposing face, a length of the lower magnetic pole layer in a track width direction is larger than a length of the upper magnetic pole layer in the track width direction,
wherein the groove has an adjoining potion extending from the main portion to a part of the back region, and
wherein a cross-sectional size of the adjoining portion extending to the back region gradually increases in the track width direction of the lower core layer.

12. A thin-film magnetic head according to claim 11, wherein a back insulating layer is deposited in the back region of the gap layer.

13. A thin-film magnetic head according to claim 12, wherein the back insulating layer has a sloping face such that a thickness of the back insulating layer increases toward the back region.

14. A thin-film magnetic head according to claim 11, wherein the length of the upper magnetic pole layer from the opposing face is not less than a width of the upper magnetic pole layer.

15. A thin-film magnetic head according to claim 11, wherein the gap layer comprises metal.

16. A thin-film magnetic head according to claim 11, wherein each of the upper magnetic pole layer and the lower magnetic pole layer comprises one alloy selected from the group consisting of a Ni—Fe alloy; a Ni—Fe—Nb alloy; a Co—Fe alloy; a Co—Fe—Ni alloy; a Co—Fe—Ni—X alloy wherein X is at least one element selected from the group consisting of Mo, Cr, Pd, B and In; a Co—Zr—Nb alloy; a Co—Hf—Nb alloy; an Fe—M—C alloy wherein M is at least one element selected from the group consisting of Hf, Zr, Ti, V, Nb, Ta, Cr, Mo, and W; a T—X—M—Z—Q alloy wherein T is at least one element of Fe and Co, X is at least one element of Si and Al, M is at least one element selected from the group consisting of Hf, Zr, Ti, V, Nb, Ta, Cr, Mo, and W, Z is at least one element of C and N, and Q is at least one element selected from the group consisting of Cr, Re, Rh, Ni, Pd, Pt, and Au; a T—Si—Al—M—Z—Q alloy wherein T is at least one element of Fe and Co, M is at least one element of Hf, Zr, Nb, and Ta, Z is at least one element of C and N, and Q is at least one element selected from the group consisting of, Cr, Ti, Mo, W, V, Re, Ru, Ni, Pd, Pt, and Au; and an Fe—M—O alloy wherein M is at least one element selected from the group consisting of Hf, Zr, Ti, V, Nb, Ta, Cr, Mo, and W.

17. A thin-film magnetic head according to claim 11, wherein a width of the main portion of the groove is not greater than 1 µm.

18. A combined thin-film magnetic head comprising:
a magnetic read head having a magnetoresistive element, and
a thin-film magnetic head according to claim 11.

* * * * *

UNITED STATES PATENT AND TRADEMARK OFFICE
CERTIFICATE OF CORRECTION

PATENT NO. : 6,477,006 B1
DATED : November 5, 2002
INVENTOR(S) : Kiyoshi Sato

It is certified that error appears in the above-identified patent and that said Letters Patent is hereby corrected as shown below:

Column 30,
Line 29, delete "." (period) immediately after "layer in".

Column 32,
Line 1, delete "potion" and substitute -- portion -- in its place.

Signed and Sealed this

Eighteenth Day of March, 2003

JAMES E. ROGAN
*Director of the United States Patent and Trademark Office*